(12) United States Patent
Horikawa

(10) Patent No.: US 9,110,696 B2
(45) Date of Patent: Aug. 18, 2015

(54) THIN CLIENT SYSTEM, CONNECTION MANAGEMENT SERVER, CONNECTION MANAGEMENT METHOD AND CONNECTION MANAGEMENT PROGRAM

(71) Applicant: NEC Corporation, Minato-ku, Tokyo (JP)

(72) Inventor: Satoshi Horikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 13/735,149

(22) Filed: Jan. 7, 2013

(65) Prior Publication Data

US 2013/0227567 A1 Aug. 29, 2013

(30) Foreign Application Priority Data

Feb. 23, 2012 (JP) ................................ 2012-037602

(51) Int. Cl.
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5033* (2013.01); *G06F 9/5077* (2013.01); *G06F 2009/45562* (2013.01)

(58) Field of Classification Search
CPC ................................................ G06F 9/45533
USPC ............................................................ 718/1
See application file for complete search history.

(56) References Cited

U.S. PATENT DOCUMENTS

| 2006/0233367 | A1* | 10/2006 | Birrell et al. .................. 380/210 |
| 2008/0271020 | A1* | 10/2008 | Leitz et al. ........................ 718/1 |
| 2010/0192143 | A1 | 7/2010 | Ingle et al. |
| 2010/0274759 | A1 | 10/2010 | Yamamoto et al. |

(Continued)

FOREIGN PATENT DOCUMENTS

| JP | 2010231661 A | 10/2010 |
| JP | 2010257426 A | 11/2010 |
| JP | 2011248742 A | 12/2011 |

OTHER PUBLICATIONS

Coincident, Wiktionary, retrieved Nov. 25, 2014, https://en.wiktionary.org/wiki/coincident.*

(Continued)

*Primary Examiner* — Emerson Puente
*Assistant Examiner* — Charlie Sun
(74) *Attorney, Agent, or Firm* — Sughrue Mion, PLLC

(57) ABSTRACT

A thin client system comprises a virtual machine server, a thin client terminal, a connection management server, and a virtual machine management server which executes reverting processing of the virtual machine, wherein the connection management server includes a session management unit which determines the virtual machine to be allocated to the thin client terminal based on a to-be-reverted list stored in which virtual machines to be reverted are arranged in descending order of differential disk capacities, and a maintenance processing management unit which requests the virtual machine management server to execute reverting processing, wherein the session management unit when a virtual machine not included in the to-be-reverted list exists, allocates the virtual machine in question to the thin client terminal, and when all the virtual machines are included in the to-be-reverted list, allocates the virtual machine whose differential disk capacity is the smallest to the thin client terminal.

8 Claims, 15 Drawing Sheets

(56) References Cited

U.S. PATENT DOCUMENTS

| | | | |
|---|---|---|---|
| 2011/0196968 A1* | 8/2011 | Kobayashi et al. | 709/226 |
| 2012/0030349 A1* | 2/2012 | Sugai | 709/224 |
| 2012/0239729 A1* | 9/2012 | Hefter | 709/203 |
| 2013/0067187 A1* | 3/2013 | Moss et al. | 711/170 |
| 2013/0339956 A1* | 12/2013 | Murase et al. | 718/1 |

OTHER PUBLICATIONS

Differential, Wiktionary, retrieved Nov. 6, 2014, https://en.wiktionary.org/wiki/differential.*

Krsul I et al., "VMP1 ants: Providing and Managing Virtual Machine Execution Environments for Grid Computing", Supercomputing, 2004. Proceedings of the ACM/IEEE SC2004 Conference Pittsburgh, PA, Nov. 6-12, 2004, Piscataway, NJ, IEEE, Nov. 6, 2004, pp. 1-7, XP010780332, DOI: 10.1109 SC.2004.67, ISBN: 978-0-7695-2153-4.

Sapuntzakis C P et al., "0ptimizing the migration of virtual computers", Proceedings of the Fifth Symposium on Operating Systems Design and Implementation (OSDI'02) USENIX Assoc Berkeley. CA, Dec. 9, 2002, pp. 1-14, XP002689041, ISBN: 1-931971-06-4.

The European Search Report for EP Application No. EP13152073.6 dated on Dec. 15, 2014.

* cited by examiner

VIRTUAL MACHINE INFORMATION TABLE 210

| VIRTUAL MACHINE GROUP | VIRTUAL MACHINE NAME | DIFFERENTIAL DISK CAPACITY |
|---|---|---|
| VPCGroup1 | VPC1 | 1GB |
| VPCGroup1 | VPC2 | 1GB |
| VPCGroup1 | VPC3 | 0.4GB |
| VPCGroup2 | VPC4 | 1.5GB |
| | | |

FIG. 3  USER INFORMATION TABLE 310

| USER GROUP | USER NAME | PASSWORD |
|---|---|---|
| UserGroup1 | User1 | xxxx |
| UserGroup1 | User2 | xxxx |
| UserGroup2 | User3 | xxxx |
|  |  |  |
|  |  |  |

FIG. 4

CONNECTION SETTING TABLE 150

| USER GROUP NAME | VIRTUAL MACHINE GROUP NAME |
|---|---|
| UserGroup1 | VPCGroup1 |
| UserGroup2 | VPCGroup2 |
|  |  |

FIG. 5

VIRTUAL MACHINE STATE TABLE 151

| VIRTUAL MACHINE NAME | USER NAME | MANAGEMENT STATE | DIFFERENTIAL DISK CAPACITY |
|---|---|---|---|
| VPC1 |  | IN MAINTENANCE | 1GB |
| VPC2 | User1 | IN DISTRIBUTION | 1GB |
| VPC3 |  | AVAILABLE | 0.4GB |
| VPC4 |  | AVAILABLE | 1.5GB |
|  |  |  |  |

MAINTENANCE PROCESSING MANAGEMENT TABLE 160

| BATCH ACTIVATION TIME | BATCH PROCESSING EXECUTION PERIOD | THE NUMBER OF SIMULTANEOUSLY EXECUTED MACHINES |
|---|---|---|
| EVERY SATURDAY AT 0:00 | 6 HOURS | 10 |
|  |  |  |

TO-BE-REVERTED LIST 140

| DIFFERENTIAL DISK CAPACITY | VIRTUAL MACHINE NAME |
|---|---|
| 5GB | VPC3 |
| 3GB | VPC1 |
| 1.4GB | VPC2 |
| : | : |

FIG. 12

VIRTUAL MACHINE STATE TABLE 151

| VIRTUAL MACHINE NAME | USER NAME | USER NAME USED LAST | MANAGEMENT STATE | DIFFERENTIAL DISK CAPACITY |
|---|---|---|---|---|
| VPC1 | User1 | | IN MAINTENANCE | 1GB |
| VPC2 | | User1 | IN DISTRIBUTION | 1GB |
| VPC3 | | | AVAILABLE | 0.4GB |
| VPC4 | | | AVAILABLE | 1.5GB |
| | | | | |

MAINTENANCE PROCESSING MANAGEMENT TABLE 160

| BATCH ACTIVATION TIME | BATCH PROCESSING EXECUTION PERIOD | THE NUMBER OF SIMULTANEOUSLY EXECUTED MACHINES | DIFFERENTIAL DISK CAPACITY THRESHOLD VALUE |
|---|---|---|---|
| EVERY SATURDAY 0:00 | 6 HOURS | 10 | 3GB |
|  |  |  |  |

THIN CLIENT SYSTEM, CONNECTION MANAGEMENT SERVER, CONNECTION MANAGEMENT METHOD AND CONNECTION MANAGEMENT PROGRAM

TECHNICAL FIELD

The present invention relates to a thin client system and, more particularly, a reverting processing execution method.

BACKGROUND ART

In recent years, as a virtual machine producing method, Linked Clone/Differential Clone system has been developed which share a master image. This system is suitable for a thin client system in which a plurality of users share one virtual machine because an extremely smaller disk space is required for producing a large number of virtual machines of the same image as compared with a common system.

In the Linked Clone/Differential Clone system, since use of each virtual machine generates a difference from a master image to consume a disk capacity, a differential disk should be deleted periodically to execute reverting processing of initializing a virtual machine.

As an existing method of executing maintenance of a thin client system, proposed is a method in which with a virtual machine duplexed, one side executes updating and a user uses the other side virtual machine to restore an image after the use by the user.

The thin client system which shares a virtual machine has a plurality of features as follows.

First feature is allowing a user to use any virtual machine as long as it is based on the same image. Second feature is allowing execution of reverting processing when not used by a user. Third feature is allowing reverting processing any time because no information peculiar to a user is preserved in a virtual machine.

Patent Literature 1: Japanese Patent Laying-Open No. 2011-248742

Patent Literature 2: Japanese Patent Laying-Open No. 2010-257426

Patent Literature 3: Japanese Patent Laying-Open No. 2010-231661

A large scale thin client system having several thousands to several tens of thousands of virtual machines to be reverted has a problem of being difficulty in production of a standby system by simple virtual machine duplexing or in execution of maintenance of all the machines in the lump at a fixed maintenance time.

It is necessary to provide a method of efficiently executing reverting processing in a thin client system by making the most of these features of the system in which a virtual machine is shared among users.

OBJECT OF THE INVENTION

An object of the present invention is to solve the above-described problems and provide a thin client system, a connection management server, a connection management method and a connection management program which enable reverting processing to be executed efficiently in a thin client system where a virtual machine is shared among users.

SUMMARY

According to a first exemplary aspect of the invention, a thin client system comprising:
a virtual machine server on which a virtual machine operates,
a thin client terminal to be connected to the virtual machine,
a connection management server which manages connection between the thin client terminal and the virtual machine, and
a virtual machine management server including a reverting processing execution unit which executes reverting processing of the virtual machine, wherein
the connection management server includes
a ranking information storage unit having a to-be-reverted list stored in which virtual machines to be reverted are arranged in descending order of differential disk capacities,
a session management unit which determines the virtual machine to be allocated to the thin client terminal based on the to-be-reverted list, and
a maintenance processing management unit which refers to the to-be-reverted list to request the virtual machine management server to execute reverting processing in descending order of differential disk capacities, wherein
the session management unit
when available virtual machines include a virtual machine not included in the to-be-reverted list, allocates the virtual machine in question to the thin client terminal, and
when all the available virtual machines are included in the to-be-reverted list, allocates the virtual machine whose differential disk capacity is the smallest in the to-be-reverted list to the thin client terminal.

According to a second exemplary aspect of the invention, a thin client system comprising:
a virtual machine server on which a virtual machine operates,
a thin client terminal to be connected to the virtual machine,
a connection management server which manages connection between the thin client terminal and the virtual machine, and
a virtual machine management server including a reverting processing execution unit which executes reverting processing of the virtual machine, wherein
the connection management server includes
a ranking information storage unit having a to-be-reverted list stored in which virtual machines to be reverted are arranged in descending order of differential disk capacities, and
a session management unit which determines the virtual machine to be allocated to the thin client terminal based on the to-be-reverted list, wherein
the session management unit
when available virtual machines include a virtual machine not included in the to-be-reverted list, allocates the virtual machine in question to the thin client terminal, and
when all the available virtual machines are included in the to-be-reverted list, allocates the virtual machine whose differential disk capacity is the smallest in the to-be-reverted list to the thin client terminal.

According to a third exemplary aspect of the invention, a thin client system comprising:
a virtual machine server on which a virtual machine operates,
a thin client terminal to be connected to the virtual machine, a connection management server which manages connection between the thin client terminal and the virtual machine, and a virtual machine management server including a reverting processing execution unit which executes reverting processing of the virtual machine, wherein the connection management server includes a ranking information storage unit having a to-be-reverted list stored in which virtual machines to be reverted are arranged in descending order of differential disk capacities, and a maintenance processing management unit which refers to the to-be-reverted list to request the virtual machine management server to execute reverting processing in descending order of differential disk capacities.

According to a fourth exemplary aspect of the invention, a connection management server which manages connection between a thin client terminal and a virtual machine, comprising:

a ranking information storage unit having a to-be-reverted list stored in which virtual machines to be reverted are arranged in descending order of differential disk capacities, a session management unit which determines the virtual machine to be allocated to the thin client terminal based on the to-be-reverted list, and a maintenance processing management unit which refers to the to-be-reverted list to request a virtual machine management server which executes reverting processing of a virtual machine to execute the reverting processing in descending order of differential disk capacities, wherein the session management unit when available virtual machines include a virtual machine not included in the to-be-reverted list, allocates the virtual machine in question to the thin client terminal, and when all the available virtual machines are included in the to-be-reverted list, allocates the virtual machine whose differential disk capacity is the smallest in the to-be-reverted list to the thin client terminal.

According to a fifth exemplary aspect of the invention, a connection management method by a connection management server which manages connection between a thin client terminal and a virtual machine, wherein a ranking information storage unit executes the ranking information storing step of storing a to-be-reverted list in which virtual machines to be reverted are arranged in descending order of differential disk capacities, a session management unit executes the session management step of determining the virtual machine to be allocated to the thin client terminal based on the to-be-reverted list, and a maintenance processing management unit executes the maintenance processing management step of referring to the to-be-reverted list to request a virtual machine management server which executes reverting processing of a virtual machine to execute reverting processing of a virtual machine in descending order of differential disk capacities, wherein the session management step includes when available virtual machines include a virtual machine not included in the to-be-reverted list, allocating the virtual machine in question to the thin client terminal, and when all the available virtual machines are included in the to-be-reverted list, allocating the virtual machine whose differential disk capacity is the smallest in the to-be-reverted list to the thin client terminal.

According to a sixth exemplary aspect of the invention, a computer-readable medium storing a connection management program operable on a computer forming a connection management server which manages connection between a thin client terminal and a virtual machine, which causes:

a ranking information storage unit to execute the ranking information storing processing of storing a to-be-reverted list in which virtual machines to be reverted are arranged in descending order of differential disk capacities, a session management unit to execute the session management processing of determining the virtual machine to be allocated to the thin client terminal based on the to-be-reverted list, and a maintenance processing management unit to execute the maintenance processing management processing of referring to the to-be-reverted list to request a virtual machine management server which executes reverting processing of a virtual machine to execute reverting processing of a virtual machine in descending order of differential disk capacities, wherein the session management processing includes when available virtual machines include a virtual machine not included in the to-be-reverted list, allocating the virtual machine in question to the thin client terminal, and when all the available virtual machines are included in the to-be-reverted list, allocating the virtual machine whose differential disk capacity is the smallest in the to-be-reverted list to the thin client terminal.

The present invention enables reverting processing to be executed efficiently in a thin client system where a virtual machine is shared among users.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing an example of a structure of a user information table according to the first exemplary embodiment of the present invention;

FIG. 4 is a diagram showing an example of a structure of a connection setting table according to the first exemplary embodiment of the present invention;

FIG. 5 is a diagram showing an example of a structure of a virtual machine state table according to the first exemplary embodiment of the present invention;

FIG. 12 is a diagram showing an example of a structure of a virtual machine state table according to a second exemplary embodiment of the present invention;

EXEMPLARY EMBODIMENT

Figures 1, 2:
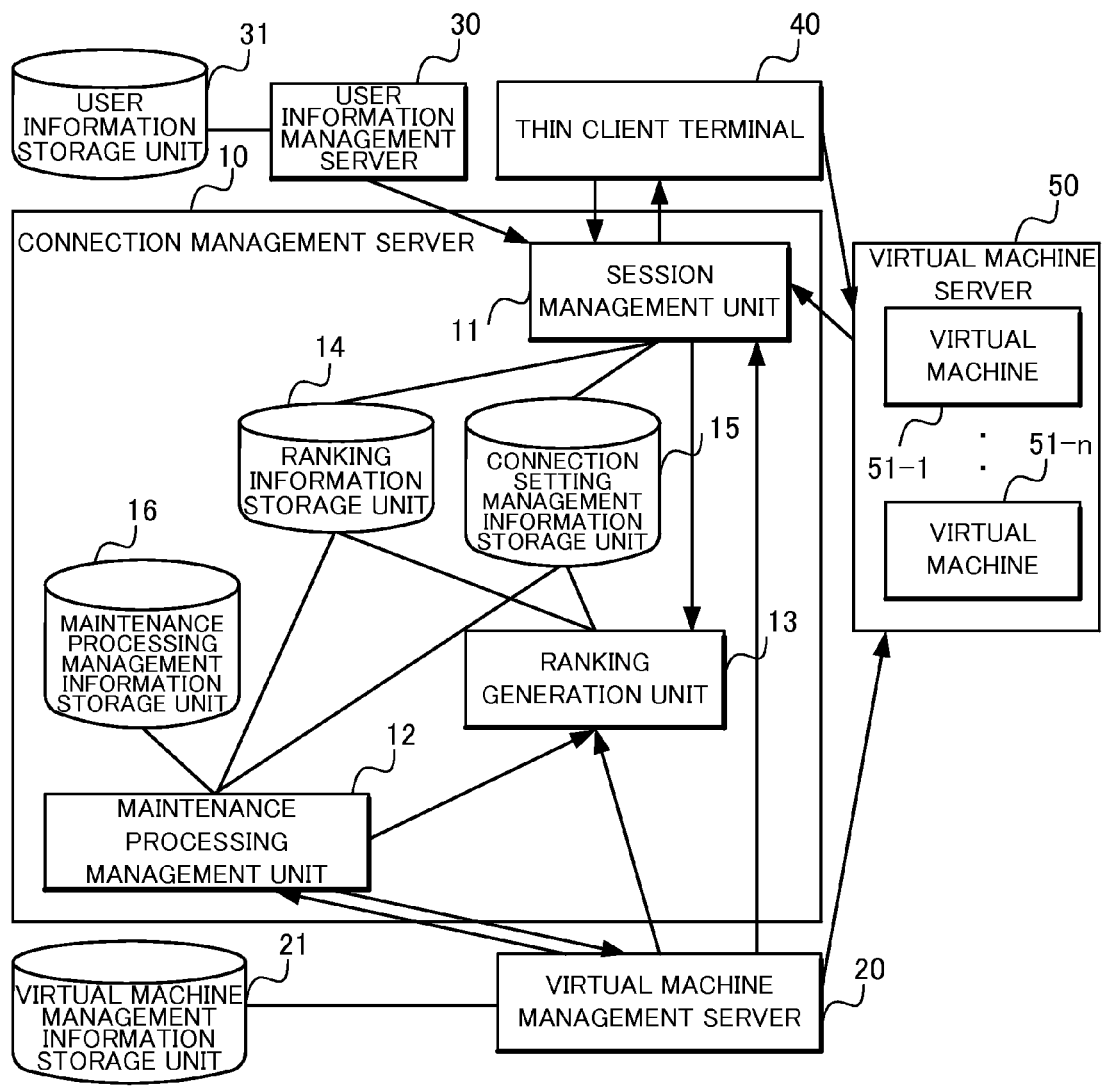
FIG. 1 is a block diagram showing a structure of a thin client system according to a first exemplary embodiment of the present invention.
FIG. 2 is a diagram showing an example of a structure of a virtual machine information table according to the first exemplary embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In order to clarify the foregoing and other objects, features and advantages of the present invention, exemplary embodiments of the present invention will be detailed in the following with reference to the accompanying drawings. Other technical problems, means for solving the technical problems and functions and effects thereof other than the above-described objects of the present invention will become more apparent from the following disclosure of the exemplary embodiments.

In all the drawings, like components are identified by the same reference numerals to appropriately omit description thereof.

First Exemplary Embodiment

First exemplary embodiment of the present invention will be detailed with reference to the drawings.

FIG. 1 is a block diagram showing a structure of a thin client system 100 according to the first exemplary embodiment of the present invention. With reference to FIG. 1, the thin client system 100 according to the present exemplary embodiment comprises a connection management server 10 which manages connection, a virtual machine management server 20 which manages a group of virtual machine servers, a user information management server 30 which manages user information for use in connection, a thin client terminal 40 for use in connection to a virtual machine 51 by a user, and a virtual machine server 50 on which a plurality of virtual machines 51 (51-1 to 51-n) operate.

Although it is assumed here for description's sake that the present exemplary embodiment is structured to have one virtual machine server 50, the structure is not limited thereto.

The virtual machine management server 20 manages the virtual machine server 50 and the virtual machine 51 operable on the virtual machine server 50 and preserves information thereof in a virtual machine management information storage unit 21.

The virtual machine management information storage unit 21, as shown in a virtual machine information table 210 of FIG. 2, stores a combination of a virtual machine name of the virtual machine 51, a virtual machine group name to which the virtual machine 51 belongs and a differential disk capacity of the virtual machine 51.

The user information management server 30 manages user authentication information and preserves the same in a user information storage unit 31.

The user information storage unit 31 stores a combination of a user name, a password and a user group to which a user belongs as shown in a user information table 310 in FIG. 3.

The connection management server 10 includes a session management unit 11, a maintenance processing management unit 12 and a ranking generation unit 13.

The session management unit 11 obtains information of the virtual machine 51 from the virtual machine management server 20 and obtains user information from the user information management server 30. Manager sets mapping between the virtual machine 51 and the user based on these information, which setting is preserved in a connection setting management information storage unit 15.

The session management unit 11 refers to information in a ranking information storage unit 14 and the connection setting management information storage unit 15 to determine a virtual machine 51-$i$ ($i$=1 to n) to be used by a user and transmit a virtual machine name to be used to the thin client terminal 40.

At the time of disconnection of the virtual machine 51-$i$, the session management unit 11 requests the ranking generation unit 13 to update the ranking information storage unit 14. The ranking generation unit 13 obtains information from the virtual machine management server 20 to update the ranking information storage unit 14.

The connection setting management information storage unit 15 includes a connection setting table 150 shown in FIG. 4 and a virtual machine state table 151 shown in FIG. 5.

The connection setting table 150 preserves information of a combination between a user group name and a virtual machine group name for managing a session between a user and the virtual machine 51.

For managing the information of each virtual machine 51, the virtual machine state table 151 preserves a virtual machine name, a user name using the virtual machine, a management state indicating whether the virtual machine 51 is being used or maintained, and a capacity of a differential disk.

The maintenance processing management unit 12 periodically executes maintenance processing based on information set in a maintenance processing management information storage unit 16 by a user. At the time of periodical maintenance processing, the maintenance processing management unit 12 refers to the ranking information storage unit 14 and the connection setting management information storage unit 15 to determine the virtual machine 51-*i* to be reverted and after updating the information of the connection setting management information storage unit 15, requests the virtual machine management server 20 to execute the reverting processing of the virtual machine 51-*i*.

When notified of the end of the reverting processing by the virtual machine management server 20, the maintenance processing management unit 12 requests the ranking generation unit 13 to delete the information of the virtual machine 51-*i* from the ranking information storage unit 14.

Figures 6, 7, 8:
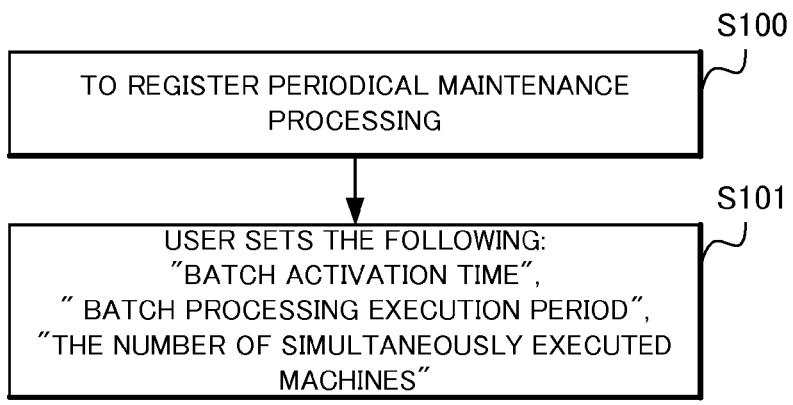
FIG. 6 is a diagram showing an example of a structure of a maintenance processing management table according to the first exemplary embodiment of the present invention.
FIG. 7 is a diagram showing an example of a structure of a to-be-reverted list according to the first exemplary embodiment of the present invention.
FIG. 8 is a flow chart showing operation of the thin client system according to the first exemplary embodiment of the present invention.

The maintenance processing management information storage unit 16 preserves a batch activation time indicative of time when maintenance processing starts, a batch processing execution period when one maintenance batch is executed, and the number of simultaneously executed machines indicating how many virtual machines are reverted simultaneously by one maintenance batch as shown in a maintenance processing management table 160 in FIG. 6.

Registration of information at the maintenance processing management information storage unit 16 is executed by a user. The user registers a maintenance processing name at the maintenance processing management information storage unit 16 of the connection management server 10.

When the user is notified of the end of use of the virtual machine 51 by the session management unit 11, the ranking generation unit 13 obtains the information of the differential disk capacity from the virtual machine management server 20 to update the information of the ranking information storage unit 14. The unit 13 also updates the information of the ranking information storage unit 14 upon receiving a request from the maintenance processing management unit 12.

The ranking information storage unit 14 preserves a list as indicated in a to-be-reverted list 140 shown in FIG. 7 in which a combination of virtual machine names and differential disk capacities are arranged in descending order of differential disk capacities.

The thin client terminal 40 sends authentication information input by the user to the session management unit 11 of the connection management server 10. Although authentication information is assumed to be a user name and a password, it is not limited thereto.

The session management unit 11 refers to the ranking information storage unit 14 and the connection setting management information storage unit 15 to determine the virtual machine 51-*i* to be distributed to the user and sends its host name to the thin client terminal 40. The thin client terminal 40 connects to the virtual machine 51-*i* based on the sent host name.

For executing reverting processing while exerting as little effect as possible on real operation of a user under a VDI environment where numbers of virtual machines exist, the present invention having the above-described structure repeats operation of periodically executing reverting processing with respect to a part of a group of virtual machines, thereby executing operation of reverting all the virtual machines. On this occasion, for reducing a disk space efficiently, in addition to producing ranking by using a differential disk space of a virtual PC to be reverted, using the ranking information also for virtual machine distribution processing allows a user to use as small the number of virtual machines to be reverted as possible. This enables the reverting processing to be efficiently executed with respect to all the virtual machines.

Description of Operation of the First Exemplary Embodiment

Next, operation of the thin client system 100 according to the present exemplary embodiment will be detailed with reference to FIG. 8 through FIG. 11.

In the present exemplary embodiment, maintenance processing of the virtual machine 51 is executed by the following manner by the maintenance processing management unit 12.

First, a manager registers periodical maintenance processing at the maintenance processing management unit 12. More specifically, the manager registers "maintenance batch activation time", "maintenance batch processing execution period" and "the number of machines whose maintenance is simultaneously executed" (S100 and S101 in FIG. 8).

Figure 9:
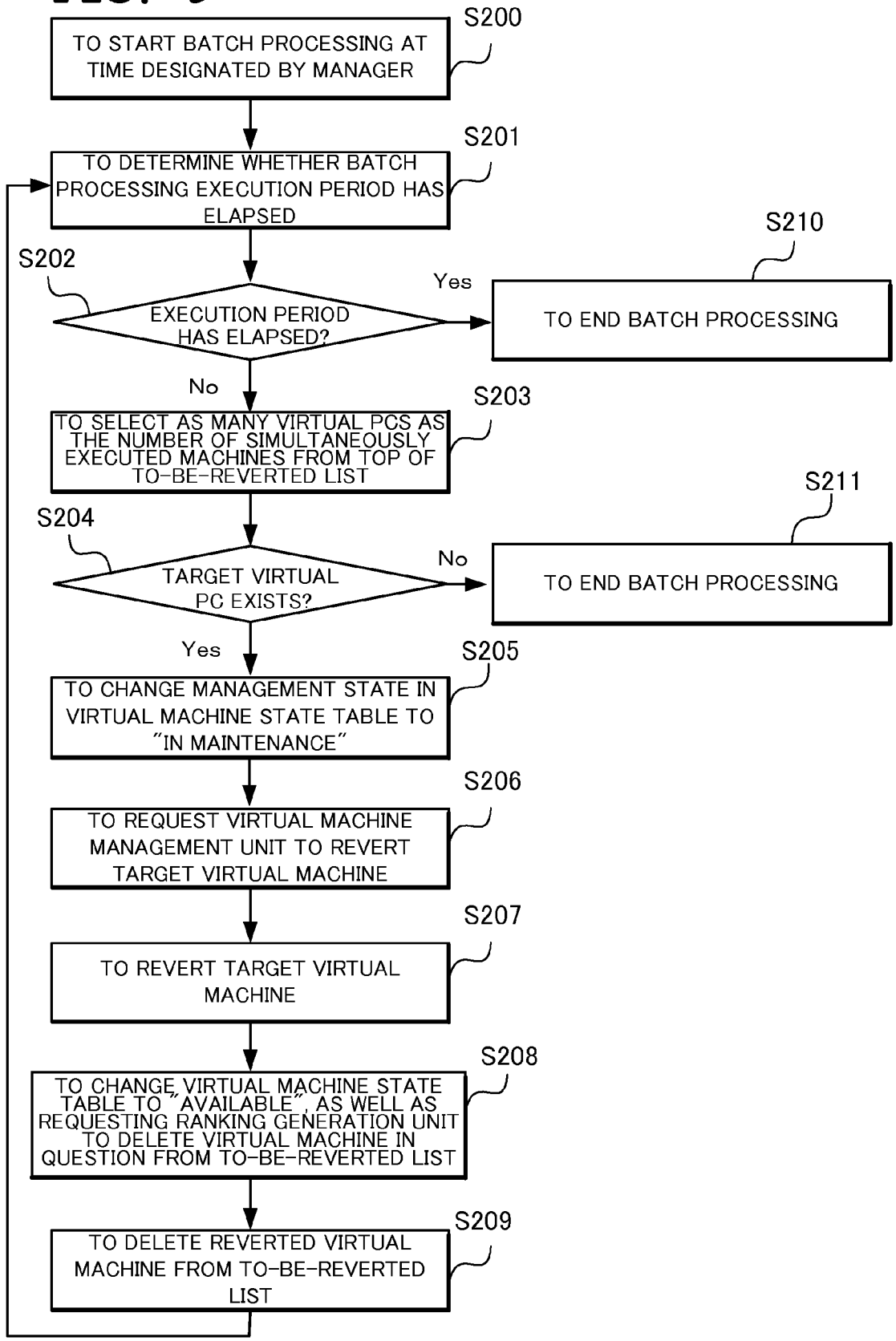
FIG. 9 is a flow chart showing operation of the thin client system according to the first exemplary embodiment of the present invention.

The maintenance processing management unit 12 starts batch processing at batch activation time set by the manager (S200 in FIG. 9). First, since the batch processing is executed for a period of time designated by the user, determine whether the batch processing time period designated by the user has elapsed or not (S201 and S202 in FIG. 9) and when it is yet to be elapsed, continue the processing.

Select as many virtual PCs as the number of simultaneously executed machines from the top of the to-be-reverted list 140 (S203 in FIG. 9). Here, when the list is empty and no target virtual PC exists, end the batch processing (S211 in FIG. 9). When a target virtual PC exists, change a management state of the target virtual machine 51-*i* in the virtual machine state table 151 to "in maintenance" (S205 in FIG. 9).

Next, the maintenance processing management unit 12 requests the virtual machine management server 20 to revert the virtual machine 51-*i* (S206 in FIG. 9).

The virtual machine management server 20 executes reverting processing of the virtual machine 51-*i* and when completing the processing, notifies the maintenance processing management unit 12 of the end of the processing (S207 in FIG. 9).

Upon receiving the notification of the end of the reverting processing, the maintenance processing management unit 12 changes the management state of the virtual machine 51-*i* in the virtual machine state table 151 to "available" to request the ranking generation unit 13 to delete the virtual machine 51-*i* in question from the machines to be reverted (S208 in FIG. 9).

Next, the ranking generation unit 13 deletes the virtual machine 51-*i* from the to-be-reverted list 140 (S209 in FIG. 9).

When the foregoing operation ends, determine whether the batch processing execution time period has elapsed or not (S201 in FIG. 9) and when it has elapsed, end the batch processing (S210 in FIG. 9).

Figure 10:
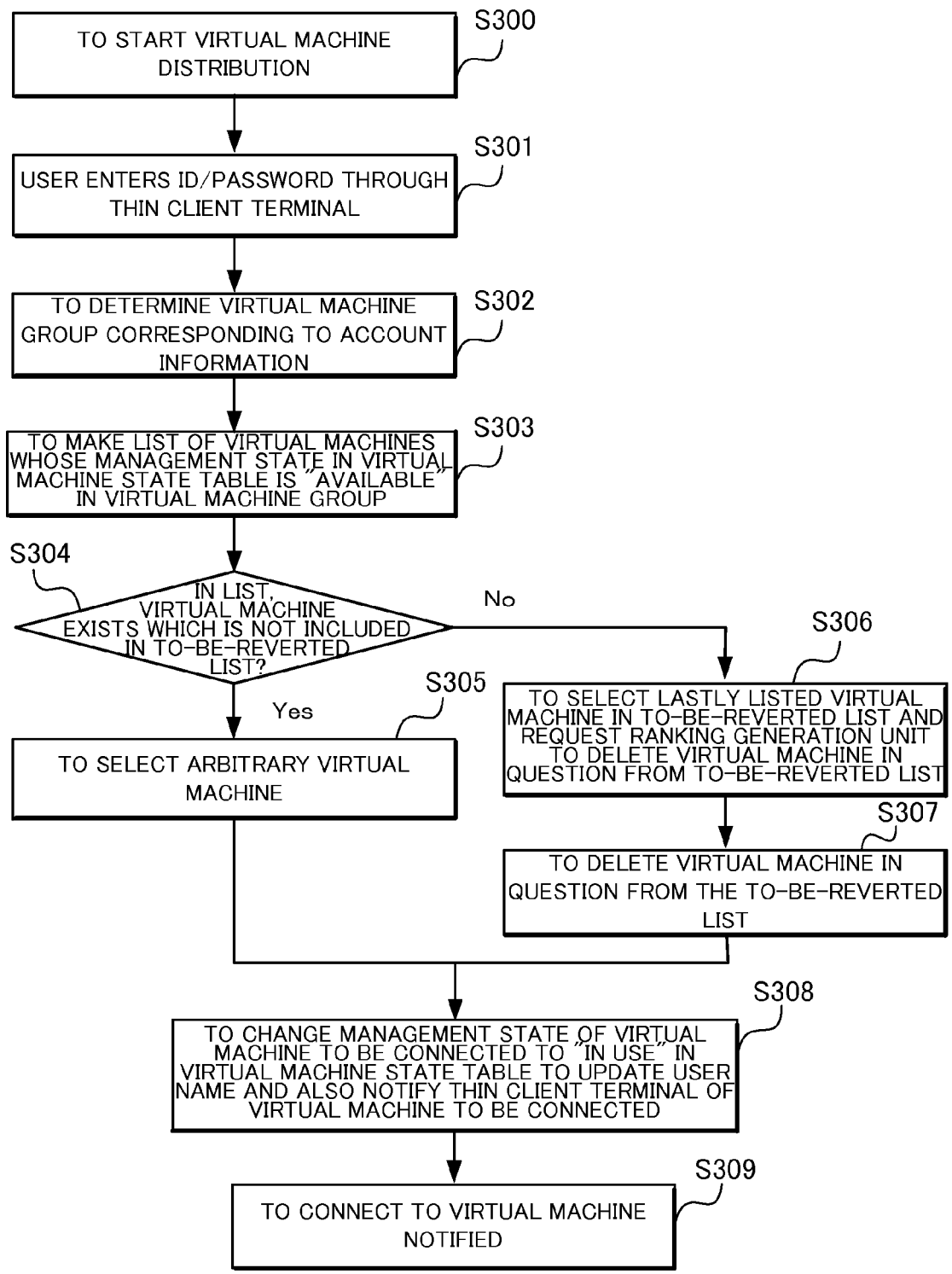
FIG. 10 is a flow chart showing operation of the thin client system according to the first exemplary embodiment of the present invention.

In the present exemplary embodiment, at the time of virtual machine allocation, the session management unit 11 allocates the virtual machine 51 by the following manner (S300 in FIG. 10).

First, the user enters an account and a password through the thin client terminal 40 (S301 in FIG. 10). The thin client terminal 40 transfers the entered information to the session management unit 11, so that the session management unit 11 refers to the connection setting table 150 to determine a virtual machine group for use in distribution (S302 in FIG. 10).

Next, the session management unit 11 refers to the virtual machine state table 151 to make a list of virtual machines including virtual machines 51 extracted whose management state is "available" (S303 in FIG. 10). Then, the session management unit 11 refers to the to-be-reverted list 140 to determine whether there exists in the virtual machine list made a virtual machine 51 not included in the to-be-reverted list 140 (S304 in FIG. 10).

When the virtual machine 51 not included in the to-be-reverted list 140 exists in the virtual machine list, the session management unit 11 selects an arbitrary virtual machine 51-*i* as a virtual machine to be distributed from among the virtual machines 51 not included in the to-be-reverted list 140 (S305 in FIG. 10).

When the virtual machine 51 not included in the to-be-reverted list 140 fails to exist in the virtual machine list, the session management unit 11 selects a lastly listed virtual machine 51-*i* which has the smallest differential disk capacity among those in the to-be-reverted list 140 as a virtual machine to be distributed to request the ranking generation unit 13 to delete the virtual machine 51-*i* in question from the to-be-reverted list 140 (S306 in FIG. 10). The ranking generation unit 13 deletes the virtual machine 51-*i* in question from the to-be-reverted list 140 (S307 in FIG. 10).

When selecting the virtual machine 51-*i* to be distributed, the session management unit 11 changes the management state of the virtual machine 51-*i* in question in the virtual machine state table 151 to "in use" to update the user name with the information entered through the thin client terminal 40.

Thereafter, the session management unit 11 notifies the thin client terminal 40 of a virtual machine name of the virtual machine 51-*i* to be distributed (S308 in FIG. 10).

The thin client terminal 40 connects to the virtual machine 51-*i* based on the virtual machine name notified by the session management unit 11 (S309 in FIG. 10).

Figure 11:
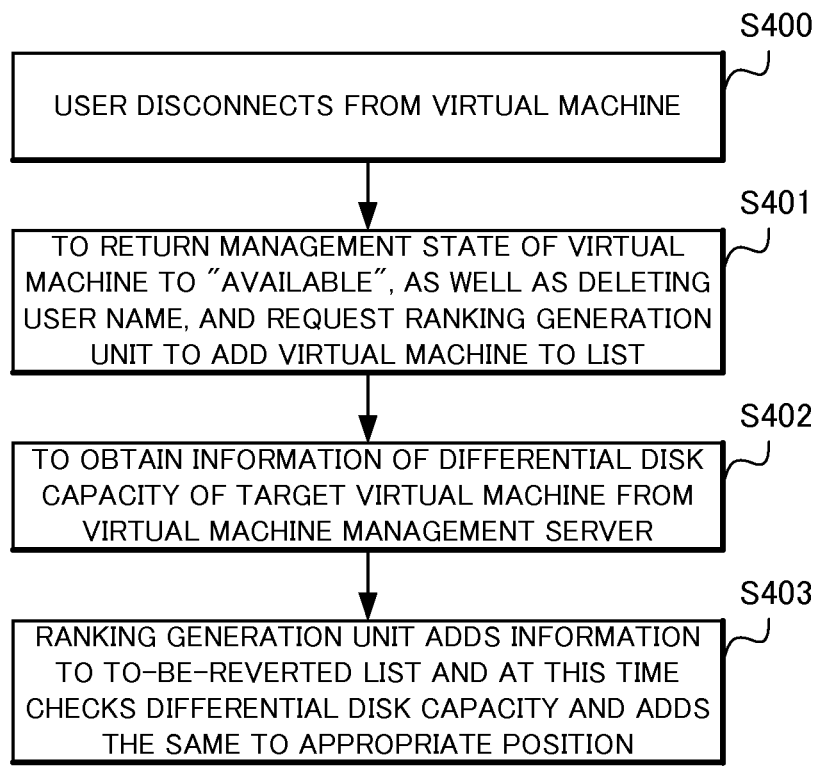
FIG. 11 is a flow chart showing operation of the thin client system according to the first exemplary embodiment of the present invention.

When the user disconnects from the virtual machine 51-*i*, the following processing is executed (S400 in FIG. 11).

First, when detecting the disconnection of the virtual machine 51-*i*, the session management unit 11 returns the management state of the virtual machine 51-*i* in question in the virtual machine state table 151 to "available", as well as deleting the relevant user name. Thereafter, the unit 11 requests the ranking generation unit 13 to add the virtual machine 51-*i* in question to the to-be-reverted list 140 (S401 in FIG. 11).

The ranking generation unit 13 obtains information of the differential disk capacity of the virtual machine 51-*i* from the virtual machine management server 20 (S402 in FIG. 11). Next, the ranking generation unit 13 searches a differential disk capacity column of the to-be-reverted list 140 to insert a column of a differential disk capacity and a virtual machine name in an appropriate position which satisfies a large-small relationship among differential disk capacities (S403 in FIG. 11).

Effects Obtained by the First Exemplary Embodiment

The present exemplary embodiment enables all the virtual machines to be reverted while appropriately controlling loads that the reverting processing places on the system.

The reason is that executing the reverting processing not upon user log-off or the like but during time and by the number of virtual machines defined by a manager enables execution of the reverting processing while controlling loads on the system by the manager.

The present exemplary embodiment also enables efficient reduction of a disk space of the entire system.

The reason is that in addition to using a differential disk capacity of a virtual machine as a selection reference of a virtual machine to be reverted, using a differential disk capacity of a virtual machine as a selection reference at the time of distribution enables distribution of as few virtual machines as a reversion target as possible.

Figure 18:
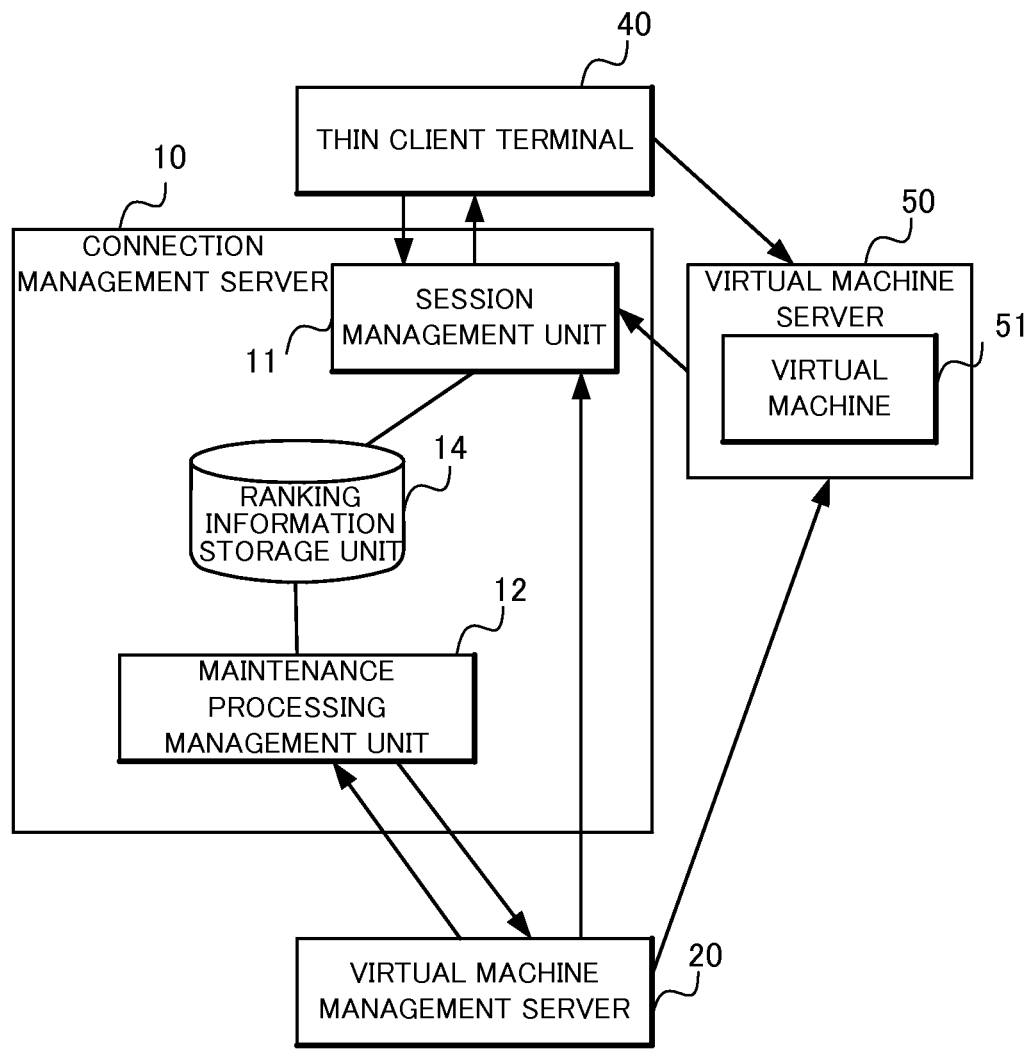
FIG. 18 is a block diagram showing an example of a minimum structure of a thin client system of the present invention.
Figure 19:
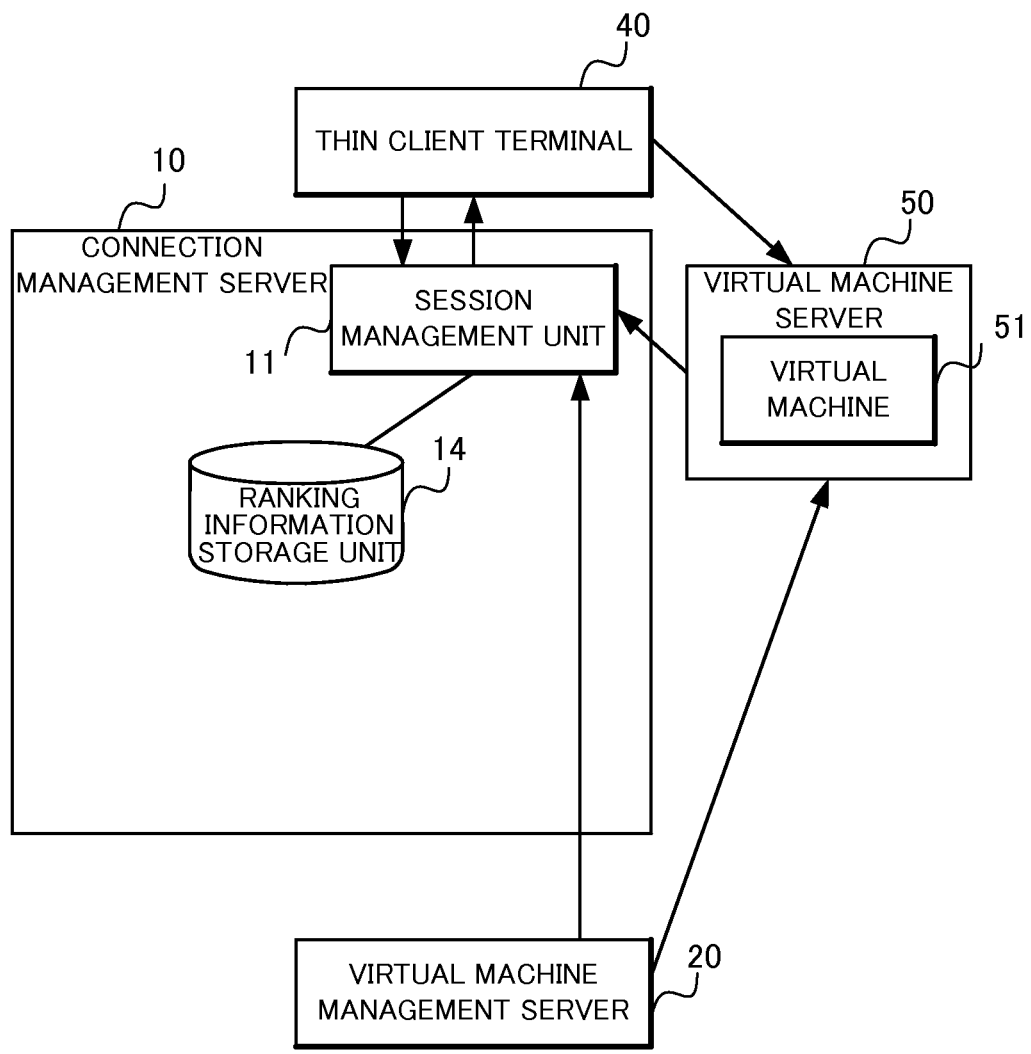
FIG. 19 is a block diagram showing an example of a minimum structure of the thin client system of the present invention.
Figure 20:
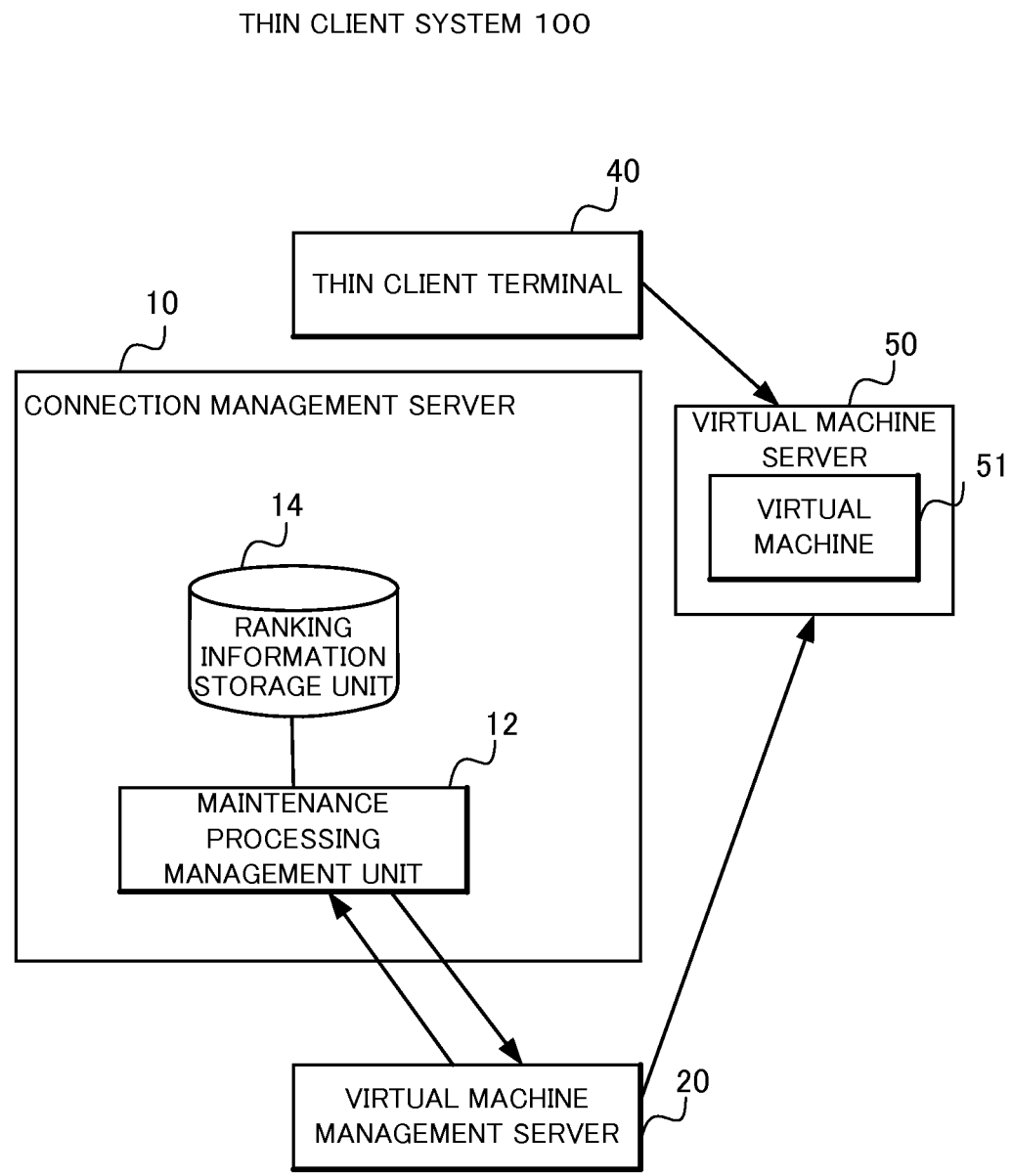
FIG. 20 is a block diagram showing an example of a minimum structure of the thin client system of the present invention.

Example of a minimum structure that can solve the problems of the present invention is shown in FIG. 18. With the thin client system 100 comprising the virtual machine server 50 on which the virtual machines 51 operates, the thin client terminal 40 which connects to the virtual machine 51, the connection management server 10 which manages connection between the thin client terminal 40 and the virtual machine 51, and the virtual machine management server 20 including the reverting processing execution unit which executes the reverting processing of the virtual machine 51, the connection management server 10 including the ranking information storage unit 14 which stores the to-be-reverted list 140 in which the virtual machines 51 to be reverted are arranged in descending order of differential disk capacities, the session management unit 11 which determines a virtual machine to be allocated to the thin client terminal 40 based on the to-be-reverted list 140, and the maintenance processing management unit 12 which refers to the to-be-reverted list 140 to request the virtual machine management server 20 to execute the reverting processing in descending order of differential disk capacities, the above-described problems of the present invention can be solved by, when available virtual machines 51 include a virtual machine 51 not included in the to-be-reverted list 140, allocation of the relevant virtual machine 51 to the thin client terminal 40 by the session management unit 11 and when all the available virtual machines 51 are included in the to-be-reverted list 140, allocation of the virtual machine 51 whose differential disk capacity is the smallest in the to-be-reverted list 140 to the thin client terminal 40. Such minimum structures as shown in FIG. 19 and FIG. 20 also enable the reverting processing to be executed efficiently.

Second Exemplary Embodiment

Next, a second exemplary embodiment of the present invention will be described.

Figures 13, 14:
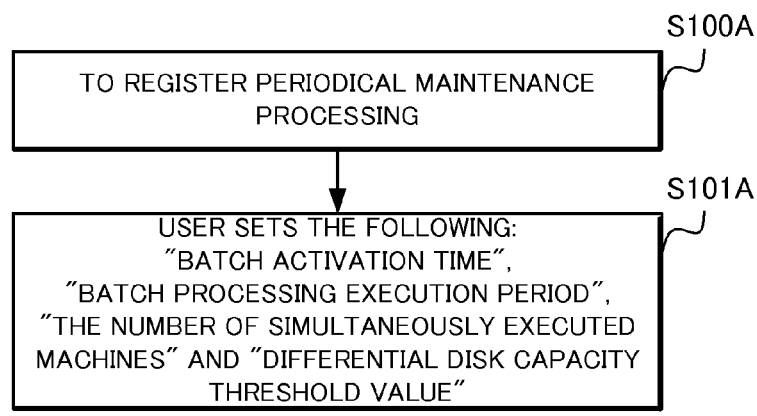
FIG. 13 is a diagram showing an example of a structure of a maintenance processing management table according to the second exemplary embodiment of the present invention.
FIG. 14 is a flow chart showing operation of the thin client system according to the second exemplary embodiment of the present invention.

FIG. 12 is a diagram showing an example of a structure of the virtual machine state table 151 according to the present exemplary embodiment. FIG. 13 is a diagram showing an example of a structure of the maintenance processing management table 160 according to the present exemplary embodiment.

With reference to FIG. 12, the virtual machine state table 151 according to the present exemplary embodiment further includes information of the user name used last as compared with the first exemplary embodiment shown in FIG. 5. As the user name used last, a user name which has last used the virtual machine in question is preserved.

With reference to FIG. 13, the maintenance processing management table 160 according to the present exemplary embodiment further includes a differential disk capacity threshold value as compared with the first exemplary embodiment shown in FIG. 6. Differential disk capacity threshold value is used for determining whether information of the user name used last should be preserved or not.

Description of Operation of the Second Exemplary Embodiment

Next, operation of the thin client system 100 according to the present exemplary embodiment will be described in detail with reference to FIG. 14 through FIG. 17.

In the present exemplary embodiment, the maintenance processing of the virtual machine 51 will be executed by the following manner at the maintenance processing management unit 12.

First, the manager registers periodical maintenance processing at the maintenance processing management unit 12. More specifically, the manager registers "differential disk capacity threshold value" in addition to "maintenance batch activation time", "maintenance batch processing execution period" and "the number of simultaneously executed machines" (S101A in FIG. 14).

Figure 15:
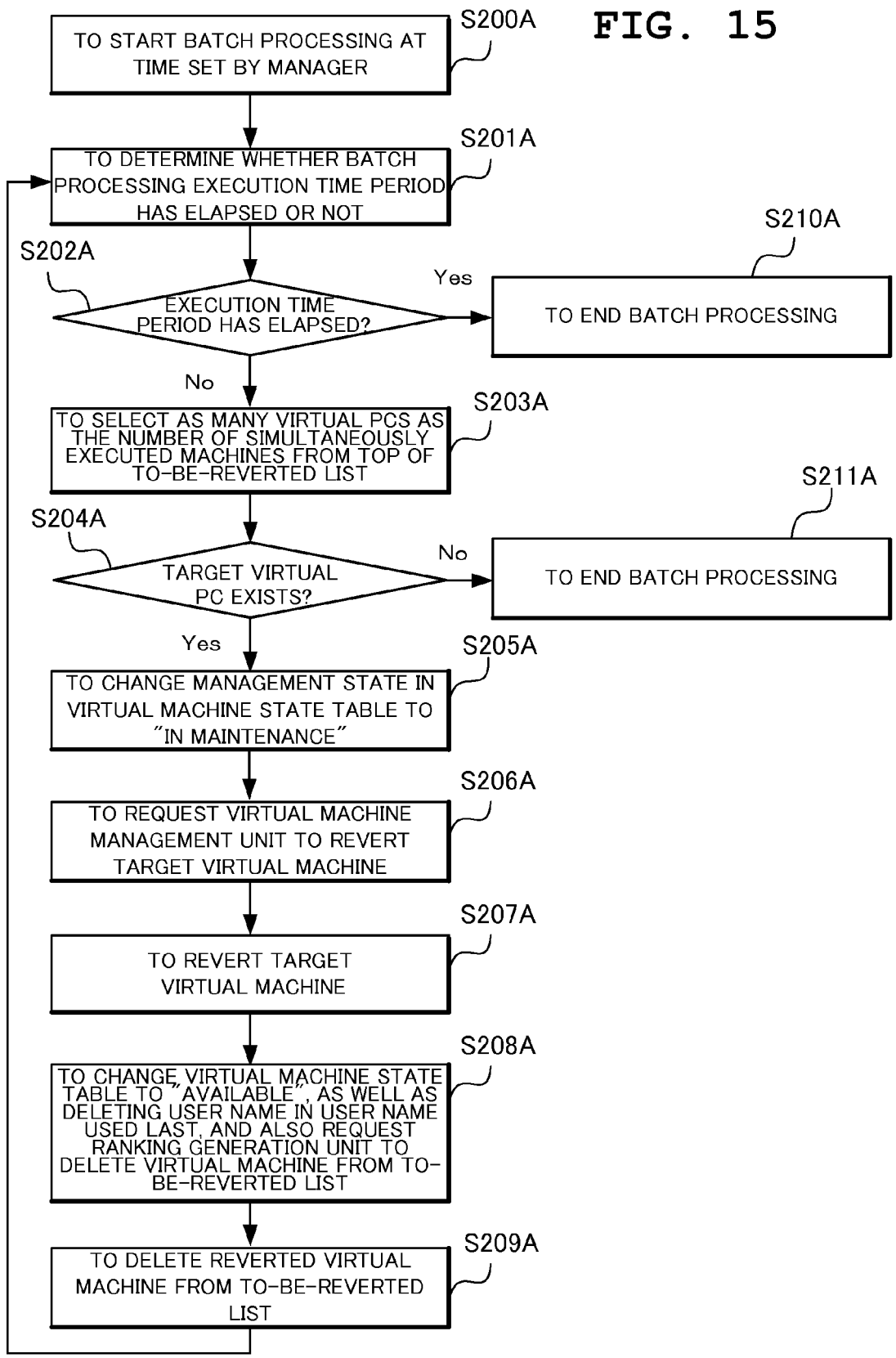
FIG. 15 is a flow chart showing operation of the thin client system according to the second exemplary embodiment of the present invention.

The system operates in a manner as shown in FIG. 15 at the time of maintenance processing. Since FIG. 15 is the same as FIG. 9 except S208A, no description will be made of other parts than S208A.

Upon receiving a target virtual machine reversion end notification, the maintenance processing management unit 12 changes the management state of the virtual machine 51-$i$ in the virtual machine state table 151 to "available", as well as deleting the user name used last, and further requests the ranking generation unit 13 to delete the target virtual machine 51-$i$ from the machines to be reverted (S208A in FIG. 15).

Figure 16:
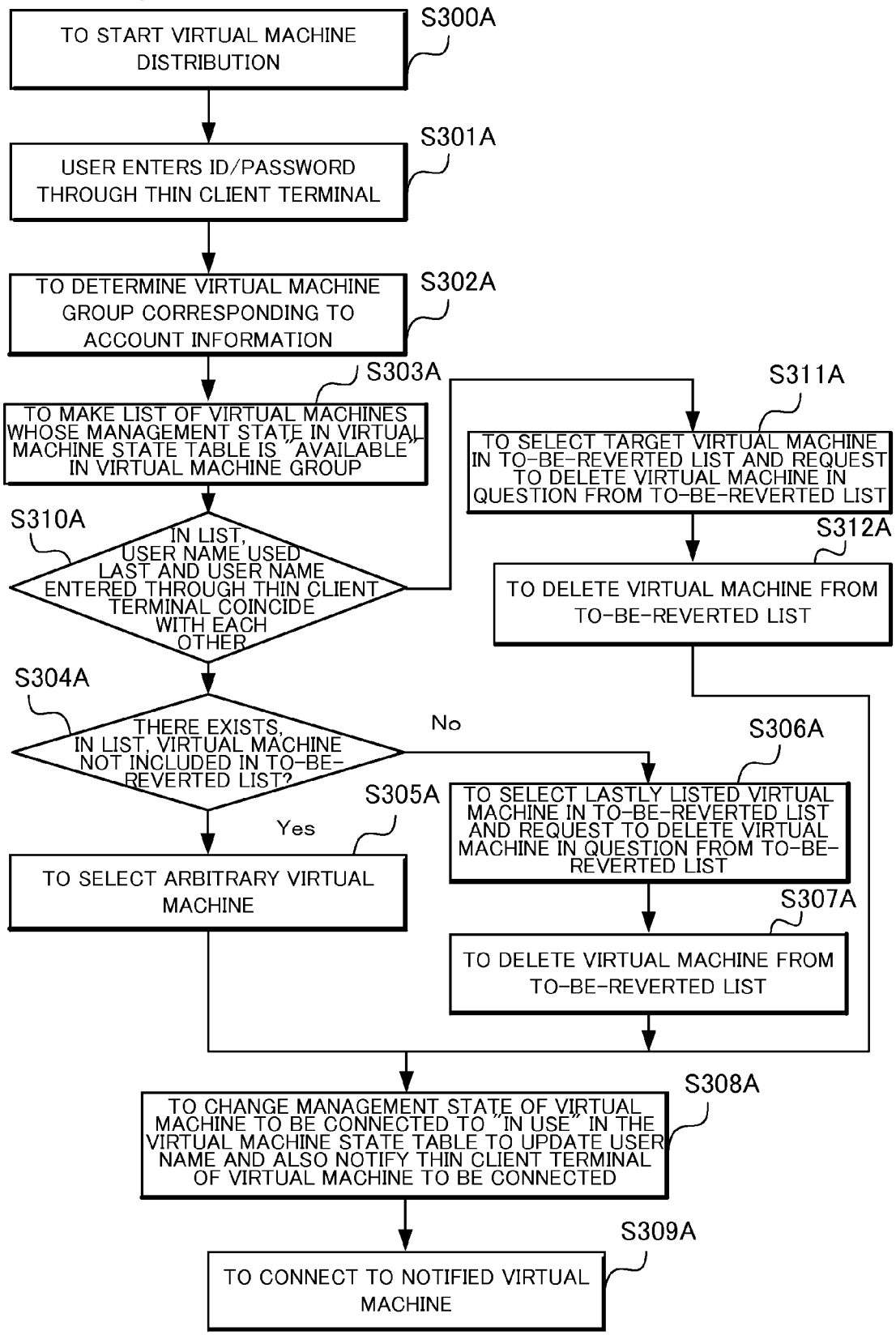
FIG. 16 is a flow chart showing operation of the thin client system according to the second exemplary embodiment of the present invention.

The system operates in a manner as shown in FIG. 16 at the time of virtual machine distribution. Since operation of S300A to S309A in FIG. 16 is the same as that of S300 to S309 in FIG. 10, no description will be made thereof.

After making a list of available virtual machines 51 at the time of virtual machine distribution (S303A in FIG. 16), refer to the virtual machine state table 151 to check whether there exists the virtual machine 51-$i$ whose user name used last coincides with a user name entered through the thin client terminal 40 among the virtual machines in the list (S310A in FIG. 16).

When there exists the virtual machine 51-$i$ having the coincident user name, the session management unit 11 selects the virtual machine 51-$i$ in question as a virtual machine to be distributed to request the ranking generation unit 13 to delete the virtual machine 51-$i$ in question from the to-be-reverted list 140 (S311A in FIG. 16). The ranking generation unit 13 deletes the virtual machine 51-$i$ in question from the to-be-reverted list 140 (S312A in FIG. 16).

When selecting the virtual machine 51-$i$ to be distributed, the session management unit 11 changes the management state of the virtual machine 51-$i$ in the virtual machine state table 151 to "in use" and updates the user name with the information input through the thin client terminal 40 to notify the thin client terminal 40 of the virtual machine name of the virtual machine 51-$i$ to be distributed (S308A in FIG. 16).

When there exists no virtual machine 51-$i$ having the coincident user name, proceed to determination whether a virtual machine exists not included in the to-be-reverted list 140 to thereafter execute the same processing as that of the first exemplary embodiment ("NO" at S304A in FIG. 16).

Figure 17:
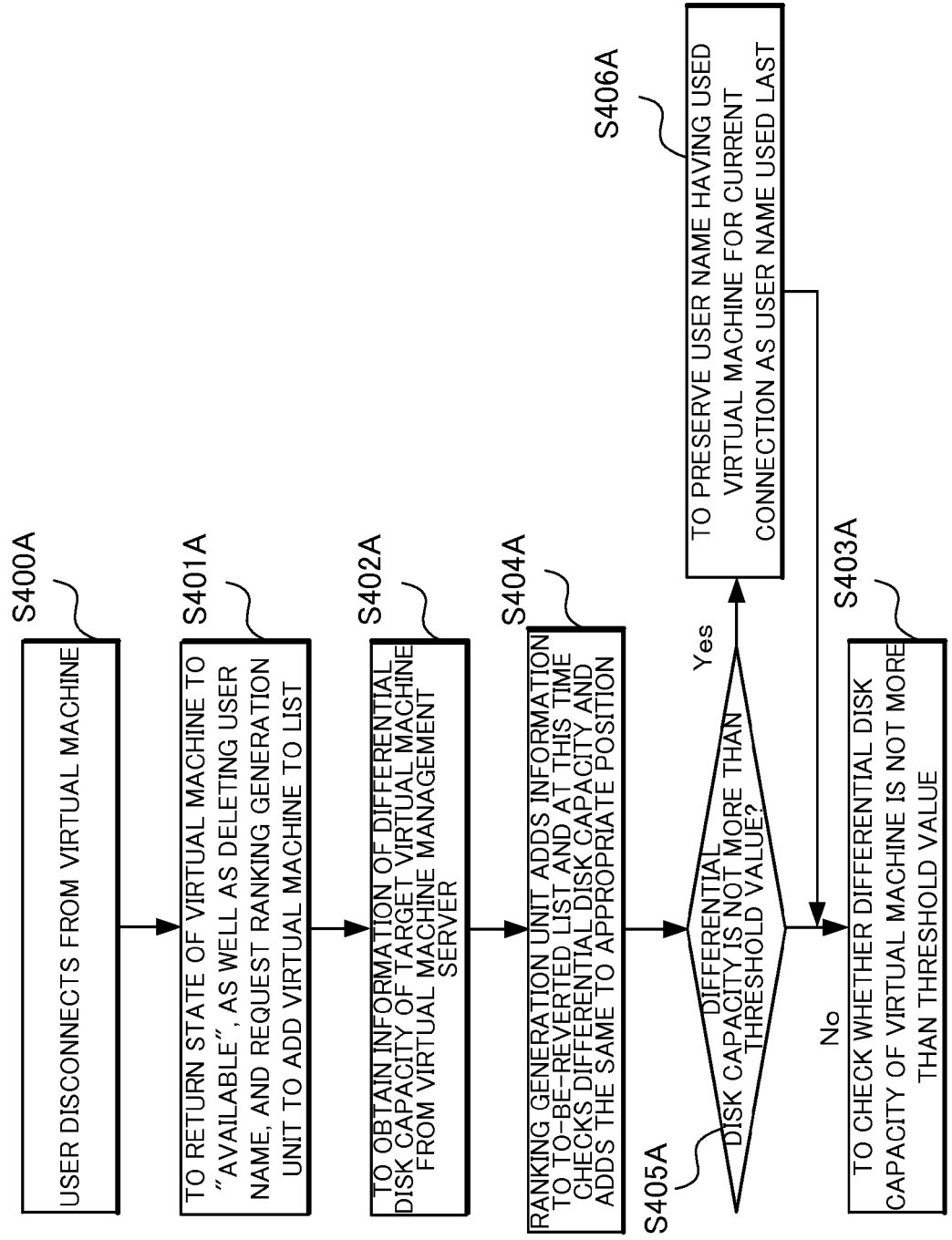
FIG. 17 is a flow chart showing operation of the thin client system according to the second exemplary embodiment of the present invention.

When the user disconnects from the virtual machine 51-$i$, the system operates in a manner as shown in FIG. 17. Since operation of S400A to S403A in FIG. 17 is the same as that of S400 to S403 in FIG. 11, no description will be made thereof.

After S401A, the ranking generation unit 13 obtains information of the differential disk capacity of the virtual machine 51-$i$ from the virtual machine management server 20 (S402A in FIG. 17). Next, the ranking generation unit 13 determines whether the differential disk capacity of the virtual machine 51-$i$ in question is not more than a differential disk capacity threshold value set by the manager (S404A and S405A in FIG. 17).

When the differential disk capacity is not more than the threshold value, the ranking generation unit 13 notifies the session management unit 11 to that effect, so that the session management unit 11 preserves a user name having used the virtual machine 51-$i$ in question before disconnection as the user name used last in the virtual machine state table 151 (S406A in FIG. 17).

Next, the ranking generation unit 13 executes updating processing of the to-be-reverted list (S403A in FIG. 17).

When the differential disk capacity is not less than the threshold value, the ranking generation unit 13 executes the updating processing of the to-be-reverted list without particularly executing the updating processing of the user name used last (S403A in FIG. 17).

Effects Obtained by the Second Exemplary Embodiment

The present exemplary embodiment enables an increase in a differential disk space to be prevented because distributing the same virtual machine as a virtual machine used last at the time of distribution of a virtual machine to each user leads to suppression of user profile production at the time of new log-in at each virtual machine.

Figure 21:
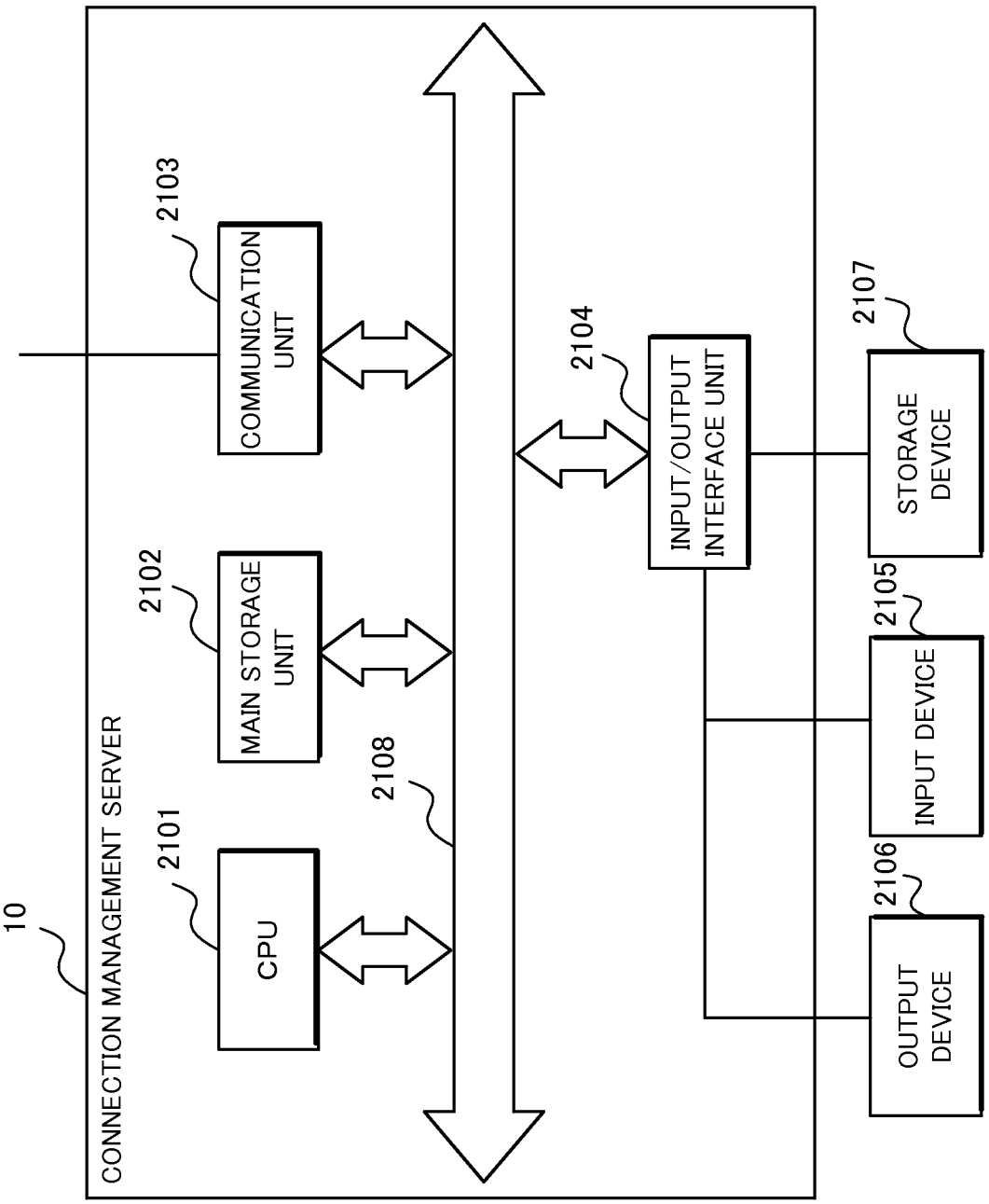
FIG. 21 is a block diagram showing an example of a hardware configuration of a connection management server of the present invention.

Next, an example of a hardware configuration of the connection management server 10 of the present invention will be described with reference to FIG. 21. FIG. 21 is a block diagram showing an example of a hardware configuration of the connection management server 10.

With reference to FIG. 21, the connection management server 10 of the present invention, which has the same hardware configuration as that of a common computer device, comprises a CPU (Central Processing Unit) 2101, a main storage unit 2102 formed of a memory such as a RAM (Random Access Memory) for use as a data working region or a data temporary saving region, a communication unit 2103 which transmits and receives data through a network, an input/output interface unit 2104 connected to an input device 2105, an output device 2106 and a storage device 2107 to transmit and receive data, and a system bus 2108 which connects each of the above-described components with each other. The storage device 2107 is realized by a hard disk device or the like which is formed of a non-volatile memory such as a ROM (Read Only Memory), a magnetic disk or a semiconductor memory.

Each function of the connection management server 10 of the present invention has its operation realized not only in hardware by mounting a circuit part as a hardware part such as an LSI (Large Scale Integration) with a program incorporated but also in software by storing a program which provides the function in the storage device 2107, loading the program into the main storage unit 2102 and executing the same by the CPU 2101.

In addition, the thin client terminal 40, the virtual machine server 50, the virtual machine management server 20 and the user information management server 30 of the present invention also have such hardware configuration as described above to realize the respective functions of the thin client terminal 40, the virtual machine server 50, the virtual machine management server 20 and the user information management server 30 in hardware or software.

Although the present invention has been described with respect to the preferred exemplary embodiments in the foregoing, the present invention is not necessarily limited to the above-described exemplary embodiments but implemented in various modifications within the scope of its technical idea.

An arbitrary combination of the foregoing components and conversion of representation of the present invention among a method, a device, a system, a recording medium, a computer program and the like are also valid as a mode of the present invention.

The respective components of the present invention need not exist independently, and the plurality of the components may be formed as one member, one component may be formed of a plurality of members, a certain component may be a part of other component, a part of a certain component and a part of other component may overlap with each other, or the like.

In addition, although the method and the computer program of the present invention have a plurality of procedures recited in order, the order of recitation does not limit the order of execution of the plurality of procedures. Accordingly, when executing the method and the computer program of the present invention, the order of the plurality of procedures can be changed within the range not hindering the contents.

Moreover, execution of the plurality of procedures of the method and the computer program of the present invention is not limited to execution at different timing with each other. Therefore, during execution of a certain procedure, other procedure might occur, a part or all of execution timing of a certain procedure and execution timing of other procedure might overlap with each other, or the like.

Furthermore, although a part or all of the above-described exemplary embodiments can be recited also as claims to follow, they are not limited to the same.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A thin client system comprising:
a virtual machine server on which a virtual machine operates,
a thin client terminal to be connected to said virtual machine,
a connection management server which manages connection between said thin client terminal and said virtual machine, and
a virtual machine management server including a reverting processing execution unit which executes reverting processing of said virtual machine, wherein
said connection management server includes
a ranking information storage unit having a to-be-reverted list stored in which virtual machines to be reverted are arranged in descending order of differential disk capacities,
a session management unit which determines said virtual machine to be allocated to said thin client terminal based on said to-be-reverted list, and
a maintenance processing management unit which refers to said to-be-reverted list to request said virtual machine management server to execute reverting processing in descending order of differential disk capacities, wherein
said session management unit
when available virtual machines include a virtual machine not included in said to-be-reverted list, allocates the virtual machine in question to said thin client terminal, and
when all the available virtual machines are included in said to-be-reverted list, allocates said virtual machine whose differential disk capacity is the smallest in said to-be-reverted list to said thin client terminal.

(Supplementary note 2) The thin client system according to supplementary note 1, comprising:
a connection setting management information storage unit which stores a virtual machine state table which manages a state of said virtual machine, wherein
said virtual machine state table includes state information indicating whether said virtual machine is any of available, in-use and in-maintenance, and
said maintenance processing management unit
with respect to said virtual machine whose reverting processing is to be requested, after changing said state information in said virtual machine state table to in-maintenance, requests said virtual machine management server to execute the reverting processing of the virtual machine in question, and
upon receiving a notification of end of said reverting processing, changes said state information in said virtual machine state table to available.

(Supplementary note 3) The thin client system according to supplementary note 2, wherein
said virtual machine state table includes information indicative of a user name used immediately before with respect to each virtual machine, and
said maintenance processing management unit, upon receiving a notification of end of said reverting processing, changes said state information in said virtual machine state table to available, as well as deleting information indicative of said user name used immediately before in said virtual machine state table.

(Supplementary note 4) The thin client system according to supplementary note 3, wherein said session management unit,
determines whether among available virtual machines there exists in the virtual machine state table a virtual machine whose said user name used immediately before is coincident with a user name using said thin client terminal,
when there exists a virtual machine having a coincident user name, allocates the virtual machine in question to said thin client terminal,
when there exists no virtual machine having a coincident user name, if available virtual machines include a virtual machine not included in said to-be-reverted list, allocates the virtual machine in question to said thin client terminal, and
when all the available virtual machines are included in said to-be-reverted list, allocates said virtual machine whose differential disk capacity is the smallest in said to-be-reverted list to said thin client terminal.

(Supplementary note 5) The thin client system according to any one of supplementary note 1 through supplementary note 4, wherein
said connection management server comprises a ranking generation unit which updates said to-be-reverted list,
said reverting processing execution unit, when reverting processing executed in response to a request from said maintenance processing management unit ends, notifies said maintenance processing management unit of the end of the reverting processing, and
said maintenance processing management unit, upon receiving the notification of the end of said reverting processing, requests said ranking generation unit to delete the virtual machine in question from said to-be-reverted list.

(Supplementary note 6) The thin client system according to any one of supplementary note 1 through supplementary note 5, wherein
said connection management server comprises the ranking generation unit which updates said to-be-reverted list, and said session management unit, when allocating said virtual machine whose differential disk capacity is the smallest in said to-be-reverted list to said thin client terminal, requests the ranking generation unit to delete the virtual machine in question from said to-be-reverted list.

(Supplementary note 7) The thin client system according to supplementary note 5 or supplementary note 6, wherein
said connection management server comprises the connection setting management information storage unit which stores the virtual machine state table which manages a state of said virtual machine,
said virtual machine state table includes state information indicating whether said virtual machine is any of available, in-use and in-maintenance, and
said session management unit, with respect to said virtual machine to be allocated to said thin client terminal, changes said state information in said virtual machine state table to in-use, as well as requesting said ranking generation unit to delete the virtual machine in question from the to-be-reverted list.

(Supplementary note 8) The thin client system according to supplementary note 7, wherein said session management unit, when detecting disconnection of said virtual machine, changes said state information of said virtual machine state table to available, as well as requesting said ranking generation unit to add the virtual machine in question to the to-be-reverted list.

(Supplementary note 9) The thin client system according to supplementary note 8, wherein
said virtual machine state table includes information indicative of a user name used immediately before with respect to each virtual machine,
said ranking generation unit
obtains a differential disk capacity of the virtual machine in question from said virtual machine management server, and
compares a predetermined differential disk capacity threshold value related to said virtual machine and said differential disk capacity obtained and when said differential disk capacity is not more than said differential disk capacity threshold value, notifies said session management unit to that effect, and
said session management unit, upon receiving said notification from said ranking generation unit, preserves a user name of a user using said thin client terminal as said user name used immediately before in said virtual machine state table.

(Supplementary note 10) A thin client system comprising:
a virtual machine server on which a virtual machine operates,
a thin client terminal to be connected to said virtual machine,
a connection management server which manages connection between said thin client terminal and said virtual machine, and
a virtual machine management server including a reverting processing execution unit which executes reverting processing of said virtual machine, wherein
said connection management server includes
a ranking information storage unit having a to-be-reverted list stored in which virtual machines to be reverted are arranged in descending order of differential disk capacities, and
a session management unit which determines said virtual machine to be allocated to said thin client terminal based on said to-be-reverted list, wherein said session management unit
when available virtual machines include a virtual machine not included in said to-be-reverted list, allocates the virtual machine in question to said thin client terminal, and
when all the available virtual machines are included in said to-be-reverted list, allocates said virtual machine whose differential disk capacity is the smallest in said to-be-reverted list to said thin client terminal.

(Supplementary note 11) The thin client system according to supplementary note 10, wherein
said virtual machine state table includes information indicative of a user name used immediately before with respect to each virtual machine, and
said session management unit,
determines whether among available virtual machines there exists in the virtual machine state table a virtual machine whose said user name used immediately before is coincident with a user name using said thin client terminal,
when there exists a virtual machine having a coincident user name, allocates the virtual machine in question to said thin client terminal,
when there exists no virtual machine having a coincident user name, if available virtual machines include a virtual machine not included in said to-be-reverted list, allocates the virtual machine in question to said thin client terminal, and
when all the available virtual machines are included in said to-be-reverted list, allocates said virtual machine whose differential disk capacity is the smallest in said to-be-reverted list to said thin client terminal.

(Supplementary note 12) The thin client system according to supplementary note 10 or supplementary note 11, wherein
said connection management server comprises a ranking generation unit which updates said to-be-reverted list, and
said session management unit, when allocating said virtual machine whose differential disk capacity is the smallest in said to-be-reverted list to said thin client terminal, requests the ranking generation unit to delete the virtual machine in question from said to-be-reverted list.

(Supplementary note 13) The thin client system according to supplementary note 12, wherein
said connection management server comprises a connection setting management information storage unit which stores the virtual machine state table which manages a state of said virtual machine,
said virtual machine state table includes state information indicating whether said virtual machine is any of available, in-use and in-maintenance, and
said session management unit, with respect to said virtual machine to be allocated to said thin client terminal, changes said state information in said virtual machine state table to in-use, as well as requesting said ranking generation unit to delete the virtual machine in question from the to-be-reverted list.

(Supplementary note 14) The thin client system according to supplementary note 13, wherein said session management unit, when detecting disconnection of said virtual machine, changes said state information of said virtual machine state table to available, as well as requesting said ranking generation unit to add the virtual machine in question to the to-be-reverted list.

(Supplementary note 15) The thin client system according to supplementary note 14, wherein
said virtual machine state table includes information indicative of a user name used immediately before with respect to each virtual machine, said ranking generation unit
obtains a differential disk capacity of the virtual machine in question from said virtual machine management server, and
compares a predetermined differential disk capacity threshold value related to said virtual machine and said differential disk capacity obtained and when said differential disk capacity is not more than said differential disk capacity threshold value, notifies said session management unit to that effect, and
said session management unit, upon receiving said notification from said ranking generation unit, preserves a user name of a user using said thin client terminal as said user name used immediately before in said virtual machine state table.

(Supplementary note 16) A thin client system comprising:
a virtual machine server on which a virtual machine operates,
a thin client terminal to be connected to said virtual machine,
a connection management server which manages connection between said thin client terminal and said virtual machine, and
a virtual machine management server including a reverting processing execution unit which executes reverting processing of said virtual machine, wherein
said connection management server includes
a ranking information storage unit having a to-be-reverted list stored in which virtual machines to be reverted are arranged in descending order of differential disk capacities, and
a maintenance processing management unit which refers to said to-be-reverted list to request said virtual machine management server to execute reverting processing in descending order of differential disk capacities.

(Supplementary note 17) The thin client system according to supplementary note 16, comprising:
a connection setting management information storage unit which stores a virtual machine state table which manages a state of said virtual machine, wherein
said virtual machine state table includes state information indicating whether said virtual machine is any of available, in-use and in-maintenance, and
said maintenance processing management unit
with respect to said virtual machine whose reverting processing is to be requested, after changing said state information in said virtual machine state table to in-maintenance, requests said virtual machine management server to execute the reverting processing of the virtual machine in question, and
upon receiving a notification of end of said reverting processing, changes said state information in said virtual machine state table to available.

(Supplementary note 18) The thin client system according to supplementary note 17, wherein
said virtual machine state table includes information indicative of a user name used immediately before with respect to each virtual machine, and
said maintenance processing management unit, upon receiving a notification of end of said reverting processing, changes said state information in said virtual machine state table to available, as well as deleting information indicative of said user name used immediately before in said virtual machine state table.

(Supplementary note 19) The thin client system according to any one of supplementary note 16 through supplementary note 18, wherein said connection management server comprises a ranking generation unit which updates said to-be-reverted list,
said reverting processing execution unit, when reverting processing executed in response to a request from said maintenance processing management unit ends, notifies said maintenance processing management unit of the end of the reverting processing, and
said maintenance processing management unit, upon receiving the notification of the end of said reverting processing, requests said ranking generation unit to delete the virtual machine in question from said to-be-reverted list.

(Supplementary note 20) A connection management server which manages connection between a thin client terminal and a virtual machine, comprising:
a ranking information storage unit having a to-be-reverted list stored in which virtual machines to be reverted are arranged in descending order of differential disk capacities,
a session management unit which determines said virtual machine to be allocated to said thin client terminal based on said to-be-reverted list, and
a maintenance processing management unit which refers to said to-be-reverted list to request a virtual machine management server which executes reverting processing of a virtual machine to execute the reverting processing in descending order of differential disk capacities, wherein
said session management unit
when available virtual machines include a virtual machine not included in said to-be-reverted list, allocates the virtual machine in question to said thin client terminal, and
when all the available virtual machines are included in said to-be-reverted list, allocates said virtual machine whose differential disk capacity is the smallest in said to-be-reverted list to said thin client terminal.

(Supplementary note 21) The connection management server according to supplementary note 20, comprising:
a connection setting management information storage unit which stores a virtual machine state table which manages a state of said virtual machine, wherein
said virtual machine state table includes state information indicating whether said virtual machine is any of available, in-use and in-maintenance, and
said maintenance processing management unit
with respect to said virtual machine whose reverting processing is to be requested, after changing said state information in said virtual machine state table to in-maintenance, requests said virtual machine management server to execute the reverting processing of the virtual machine in question, and
upon receiving a notification of end of said reverting processing, changes said state information in said virtual machine state table to available.

(Supplementary note 22) The connection management server according to supplementary note 21, wherein
said virtual machine state table includes information indicative of a user name used immediately before with respect to each virtual machine, and
said maintenance processing management unit, upon receiving a notification of end of said reverting processing, changes said state information in said virtual machine state table to available, as well as deleting information indicative of said user name used immediately before in said virtual machine state table.

(Supplementary note 23) The connection management server according to supplementary note 22, wherein said session management unit,
determines whether among available virtual machines there exists in the virtual machine state table a virtual machine whose said user name used immediately before is coincident with a user name using said thin client terminal, when there exists a virtual machine having a coincident user name, allocates the virtual machine in question to said thin client terminal, when there exists no virtual machine having a coincident user name, if available virtual machines include a virtual machine not included in said to-be-reverted list, allocates the virtual machine in question to said thin client terminal, and when all the available virtual machines are included in said to-be-reverted list, allocates said virtual machine whose differential disk capacity is the smallest in said to-be-reverted list to said thin client terminal.

(Supplementary note 24) The connection management server according to any one of supplementary note 20 through supplementary note 23, comprising a ranking generation unit which updates said to-be-reverted list, wherein said maintenance processing management unit, upon receiving the notification of the end of said reverting processing from said virtual machine management server, requests said ranking generation unit to delete the virtual machine in question from said to-be-reverted list.

(Supplementary note 25) The connection management server according to any one of supplementary note 20 through supplementary note 24, comprising the ranking generation unit which updates said to-be-reverted list, wherein said session management unit, when allocating said virtual machine whose differential disk capacity is the smallest in said to-be-reverted list to said thin client terminal, requests the ranking generation unit to delete the virtual machine in question from said to-be-reverted list.

(Supplementary note 26) The connection management server according to supplementary note 24 or supplementary note 25, comprising the connection setting management information storage unit which stores the virtual machine state table which manages a state of said virtual machine, wherein said virtual machine state table includes state information indicating whether said virtual machine is any of available, in-use and in-maintenance, and said session management unit, with respect to said virtual machine to be allocated to said thin client terminal, changes said state information in said virtual machine state table to in-use, as well as requesting said ranking generation unit to delete the virtual machine in question from the to-be-reverted list.

(Supplementary note 27) The connection management server according to supplementary note 26, wherein said session management unit, when detecting disconnection of said virtual machine, changes said state information of said virtual machine state table to available, as well as requesting said ranking generation unit to add the virtual machine in question to the to-be-reverted list.

(Supplementary note 28) The connection management server according to supplementary note 27, wherein said virtual machine state table includes information indicative of a user name used immediately before with respect to each virtual machine, said ranking generation unit obtains a differential disk capacity of the virtual machine in question from said virtual machine management server, and compares a predetermined differential disk capacity threshold value related to said virtual machine and said differential disk capacity obtained and when said differential disk capacity is not more than said differential disk capacity threshold value, notifies said session management unit to that effect, and said session management unit, upon receiving said notification from said ranking generation unit, preserves a user name of a user using said thin client terminal as said user name used immediately before in said virtual machine state table.

(Supplementary note 29) A connection management server which manages connection between a thin client terminal and a virtual machine, comprising:

a ranking information storage unit having a to-be-reverted list stored in which virtual machines to be reverted are arranged in descending order of differential disk capacities, and a session management unit which determines said virtual machine to be allocated to said thin client terminal based on said to-be-reverted list, wherein said session management unit when available virtual machines include a virtual machine not included in said to-be-reverted list, allocates the virtual machine in question to said thin client terminal, and when all the available virtual machines are included in said to-be-reverted list, allocates said virtual machine whose differential disk capacity is the smallest in said to-be-reverted list to said thin client terminal.

(Supplementary note 30) The connection management server according to supplementary note 29, wherein said virtual machine state table includes information indicative of a user name used immediately before with respect to each virtual machine, and said session management unit, determines whether among available virtual machines there exists in the virtual machine state table a virtual machine whose said user name used immediately before is coincident with a user name using said thin client terminal, when there exists a virtual machine having a coincident user name, allocates the virtual machine in question to said thin client terminal, when there exists no virtual machine having a coincident user name, if available virtual machines include a virtual machine not included in said to-be-reverted list, allocates the virtual machine in question to said thin client terminal, and when all the available virtual machines are included in said to-be-reverted list, allocates said virtual machine whose differential disk capacity is the smallest in said to-be-reverted list to said thin client terminal.

(Supplementary note 31) The connection management server according to supplementary note 29 or supplementary note 30, comprising a ranking generation unit which updates said to-be-reverted list, wherein said session management unit, when allocating said virtual machine whose differential disk capacity is the smallest in said to-be-reverted list to said thin client terminal, requests the ranking generation unit to delete the virtual machine in question from said to-be-reverted list.

(Supplementary note 32) The connection management server according to supplementary note 31, comprising a connection setting management information storage unit which stores the virtual machine state table which manages a state of said virtual machine, wherein said virtual machine state table includes state information indicating whether said virtual machine is any of available, in-use and in-maintenance, and said session management unit, with respect to said virtual machine to be allocated to said thin client terminal, changes said state information in said virtual machine state table to in-use, as well as requesting said ranking generation unit to delete the virtual machine in question from the to-be-reverted list.

(Supplementary note 33) The connection management server according to supplementary note 32, wherein said session management unit, when detecting disconnection of said virtual machine, changes said state information of said virtual machine state table to available, as well as requesting said ranking generation unit to add the virtual machine in question to the to-be-reverted list.

(Supplementary note 34) The connection management server according to supplementary note 33, wherein said virtual machine state table includes information indicative of a user name used immediately before with respect to each virtual machine, said ranking generation unit obtains a differential disk capacity of the virtual machine in question from said virtual machine management server, and compares a predetermined differential disk capacity threshold value related to said virtual machine and said differential disk capacity obtained and when said differential disk capacity is not more than said differential disk capacity threshold value, notifies said session management unit to that effect, and said session management unit, upon receiving said notification from said ranking generation unit, preserves a user name of a user using said thin client terminal as said user name used immediately before in said virtual machine state table.

(Supplementary note 35) A connection management server which manages connection between a thin client terminal and a virtual machine, comprising:

a ranking information storage unit having a to-be-reverted list stored in which virtual machines to be reverted are arranged in descending order of differential disk capacities, and a maintenance processing management unit which refers to said to-be-reverted list to request a virtual machine management server which executes reverting processing of a virtual machine to execute reverting processing in descending order of differential disk capacities.

(Supplementary note 36) The connection management server according to supplementary note 35, comprising:

a connection setting management information storage unit which stores a virtual machine state table which manages a state of said virtual machine, wherein said virtual machine state table includes state information indicating whether said virtual machine is any of available, in-use and in-maintenance, and said maintenance processing management unit with respect to said virtual machine whose reverting processing is to be requested, after changing said state information in said virtual machine state table to in-maintenance, requests said virtual machine management server to execute the reverting processing of the virtual machine in question, and upon receiving a notification of end of said reverting processing, changes said state information in said virtual machine state table to available.

(Supplementary note 37) The connection management server according to supplementary note 36, wherein said virtual machine state table includes information indicative of a user name used immediately before with respect to each virtual machine, and said maintenance processing management unit, upon receiving a notification of end of said reverting processing from said virtual machine management server, changes said state information in said virtual machine state table to available, as well as deleting information indicative of said user name used immediately before in said virtual machine state table.

(Supplementary note 38) The connection management server according to any one of supplementary note 35 through supplementary note 37, comprising a ranking generation unit which updates said to-be-reverted list, wherein said reverting processing execution unit, when reverting processing executed in response to a request from said maintenance processing management unit ends, notifies said maintenance processing management unit of the end of the reverting processing, and said maintenance processing management unit, upon receiving the notification of the end of said reverting processing, requests said ranking generation unit to delete the virtual machine in question from said to-be-reverted list.

(Supplementary note 39) A connection management method by a connection management server which manages connection between a thin client terminal and a virtual machine, wherein a ranking information storage unit executes the ranking information storing step of storing a to-be-reverted list in which virtual machines to be reverted are arranged in descending order of differential disk capacities, a session management unit executes the session management step of determining said virtual machine to be allocated to said thin client terminal based on said to-be-reverted list, and a maintenance processing management unit executes the maintenance processing management step of referring to said to-be-reverted list to request a virtual machine management server which executes reverting processing of a virtual machine to execute reverting processing of a virtual machine in descending order of differential disk capacities, wherein said session management step includes when available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 40) The connection management method according to supplementary note 39, wherein a connection setting management information storage unit executes the connection setting management information storing step of storing a virtual machine state table which manages a state of said virtual machine, said maintenance processing management step includes with respect to said virtual machine whose reverting processing is to be requested, after changing the state information in said virtual machine state table to in-maintenance, requesting said virtual machine management server to execute the reverting processing of the virtual machine in question, and upon receiving a notification of end of said reverting processing, changing said state information in said virtual machine state table to available, and said state information is information indicating whether said virtual machine is any of available, in-use and in-maintenance.

(Supplementary note 41) The connection management method according to supplementary note 40, wherein said maintenance processing management step includes, upon receiving a notification of end of said reverting processing, changing said state information in said virtual machine state table to available, as well as deleting information indicative of a user name used immediately before of said virtual machine included in said virtual machine state table.

(Supplementary note 42) The connection management method according to supplementary note 41, wherein said session management step includes determining whether among available virtual machines there exists, in said virtual machine state table including information indicative of a user name used immediately before of each virtual machine, a virtual machine whose said user name used immediately before is coincident with a user name using said thin client terminal, when there exists a virtual machine having a coincident user name, allocating the virtual machine in question to said thin client terminal, when there exists no virtual machine having a coincident user name, if available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 43) The connection management method according to any one of supplementary note 39 through supplementary note 42, wherein a ranking generation unit executes the ranking generation step of updating said to-be-reverted list, and said maintenance processing management step includes, upon receiving a notification of the end of said reverting processing from said virtual machine management server, requesting said ranking generation unit to delete the virtual machine in question from said to-be-reverted list.

(Supplementary note 44) The connection management method according to any one of supplementary note 39 through supplementary note 43, wherein the ranking generation unit executes the ranking generation step of updating said to-be-reverted list, and said session management step includes, when allocating said virtual machine whose differential disk capacity is the smallest in said to-be-reverted list to said thin client terminal, requesting the ranking generation unit to delete the virtual machine in question from said to-be-reverted list.

(Supplementary note 45) The connection management method according to supplementary note 43 or supplementary note 44, wherein the connection setting management information storage unit executes the connection setting management information storing step of storing the virtual machine state table which manages a state of said virtual machine, said session management step includes, with respect to said virtual machine to be allocated to said thin client terminal, changing the state information in said virtual machine state table to in-use, as well as requesting said ranking generation unit to delete the virtual machine in question from the to-be-reverted list, and said state information is information indicating whether said virtual machine is any of available, in-use and in-maintenance.

(Supplementary note 46) The connection management method according to supplementary note 45, wherein said session management step includes, when detecting disconnection of said virtual machine, changing said state information of said virtual machine state table to available, as well as requesting said ranking generation unit to add the virtual machine in question to the to-be-reverted list.

(Supplementary note 47) The connection management method according to supplementary note 46, wherein said ranking generation step includes obtaining a differential disk capacity of the virtual machine in question from said virtual machine management server, and comparing a predetermined differential disk capacity threshold value related to said virtual machine and said differential disk capacity obtained and when said differential disk capacity is not more than said differential disk capacity threshold value, notifying said session management unit to that effect, and said session management step includes, upon receiving said notification from said ranking generation unit, preserving a user name of a user using said thin client terminal as information indicative of a user name used immediately before of said virtual machine in said virtual machine state table.

(Supplementary note 48) A connection management method by a connection management server which manages connection between a thin client terminal and a virtual machine, wherein a ranking information storage unit executes the ranking information storing step of storing a to-be-reverted list in which virtual machines to be reverted are arranged in descending order of differential disk capacities, and a session management unit executes the session management step of determining said virtual machine to be allocated to said thin client terminal based on said to-be-reverted list, wherein said session management step includes when available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 49) The connection management method according to supplementary note 48, wherein said session management step includes determining whether among available virtual machines there exists in said virtual machine state table including information indicative of a user name used immediately before of each virtual machine, a virtual machine whose said user name used immediately before is coincident with a user name using said thin client terminal, when there exists a virtual machine having a coincident user name, allocating the virtual machine in question to said thin client terminal, when there exists no virtual machine having a coincident user name, if available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 50) The connection management method according to supplementary note 48 or supplementary note 49, wherein a ranking generation unit executes the ranking generation step of updating said to-be-reverted list, and said session management step includes, when allocating said virtual machine whose differential disk capacity is the smallest in said to-be-reverted list to said thin client terminal, requesting the ranking generation unit to delete the virtual machine in question from said to-be-reverted list.

(Supplementary note 51) The connection management method according to supplementary note 50, wherein a connection setting management information storage unit executes the connection setting management information storing step of storing the virtual machine state table which manages a state of said virtual machine, said session management step includes, with respect to said virtual machine to be allocated to said thin client terminal, changing the state information in said virtual machine state table to in-use, as well as requesting said ranking generation unit to delete the virtual machine in question from the to-be-reverted list, and said state information is information indicating whether said virtual machine is any of available, in-use and in-maintenance.

(Supplementary note 52) The connection management method according to supplementary note 51, wherein said session management step includes, when detecting disconnection of said virtual machine, changing said state information of said virtual machine state table to available, as well as requesting said ranking generation unit to add the virtual machine in question to the to-be-reverted list.

(Supplementary note 53) The connection management method according to supplementary note 52, wherein said ranking generation step includes obtaining a differential disk capacity of the virtual machine in question from said virtual machine management server, and comparing a predetermined differential disk capacity threshold value related to said virtual machine and said differential disk capacity obtained and when said differential disk capacity is not more than said differential disk capacity threshold value, notifying said session management unit to that effect, and said session management step includes, upon receiving said notification from said ranking generation unit, preserving a user name of a user using said thin client terminal as information indicative of a user name used immediately before of said virtual machine in said virtual machine state table.

(Supplementary note 54) A reverting processing management method by a connection management server which manages connection between a thin client terminal and a virtual machine, wherein a ranking information storage unit executes the ranking information storing step of storing a to-be-reverted list in which virtual machines to be reverted are arranged in descending order of differential disk capacities, and a maintenance processing management unit executes the maintenance processing management step of referring to said to-be-reverted list and requesting a virtual machine management server which executes reverting processing of a virtual machine to execute reverting processing of a virtual machine in descending order of differential disk capacities.

(Supplementary note 55) The reverting processing management method according to supplementary note 54, wherein a connection setting management information storage unit executes the connection setting management information storage step of storing a virtual machine state table which manages a state of said virtual machine, said maintenance processing management step includes with respect to said virtual machine whose reverting processing is to be requested, after changing the state information in said virtual machine state table to in-maintenance, requesting said virtual machine management server to execute the reverting processing of the virtual machine in question, and upon receiving a notification of end of said reverting processing, changing said state information in said virtual machine state table to available, and said state information is information indicating whether said virtual machine is any of available, in-use and in-maintenance.

(Supplementary note 56) The reverting processing management method according to supplementary note 55, wherein said maintenance processing management step includes, upon receiving a notification of end of said reverting processing, changing said state information in said virtual machine state table to available, as well as deleting information indicative of a user name used immediately before of said virtual machine included in said virtual machine state table.

(Supplementary note 57) The reverting processing management method according to any one of supplementary note 54 through supplementary note 56, wherein a ranking generation unit executes the ranking generation step of updating said to-be-reverted list, and said maintenance processing management step includes, upon receiving a notification of the end of said reverting processing from said virtual machine management server, requesting said ranking generation unit to delete the virtual machine in question from said to-be-reverted list.

(Supplementary note 58) A computer-readable medium storing a connection management program operable on a computer forming a connection management server which manages connection between a thin client terminal and a virtual machine, which causes:

a ranking information storage unit to execute the ranking information storing processing of storing a to-be-reverted list in which virtual machines to be reverted are arranged in descending order of differential disk capacities, a session management unit to execute the session management processing of determining said virtual machine to be allocated to said thin client terminal based on said to-be-reverted list, and a maintenance processing management unit to execute the maintenance processing management processing of referring to said to-be-reverted list to request a virtual machine management server which executes reverting processing of a virtual machine to execute reverting processing of a virtual machine in descending order of differential disk capacities, wherein said session management processing includes when available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 59) The connection management program according to supplementary note 58, which causes a connection setting management information storage unit to execute the connection setting management information storing processing of storing a virtual machine state table which manages a state of said virtual machine, wherein said maintenance processing management processing includes with respect to said virtual machine whose reverting processing is to be requested, after changing the state information in said virtual machine state table to in-maintenance, requesting said virtual machine management server to execute the reverting processing of the virtual machine in question, and upon receiving a notification of end of said reverting processing, changing said state information in said virtual machine state table to available, and said state information is information indicating whether said virtual machine is any of available, in-use and in-maintenance.

(Supplementary note 60) The connection management program according to supplementary note 59, wherein said maintenance processing management processing includes, upon receiving a notification of end of said reverting processing, changing said state information in said virtual machine state table to available, as well as deleting information indicative of a user name used immediately before of said virtual machine included in said virtual machine state table.

(Supplementary note 61) The connection management program according to supplementary note 60, wherein said session management processing includes determining whether among available virtual machines there exists, in said virtual machine state table including information indicative of a user name used immediately before of each virtual machine, a virtual machine whose said user name used immediately before is coincident with a user name using said thin client terminal, when there exists a virtual machine having a coincident user name, allocating the virtual machine in question to said thin client terminal, when there exists no virtual machine having a coincident user name, if available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 62) The connection management program according to any one of supplementary note 58 through supplementary note 61, which causes a ranking generation unit to execute the ranking generation processing of updating said to-be-reverted list, wherein said maintenance processing management processing includes, upon receiving a notification of the end of said reverting processing from said virtual machine management server, requesting said ranking generation processing unit to delete the virtual machine in question from said to-be-reverted list.

(Supplementary note 63) The connection management program according to any one of supplementary note 58 through supplementary note 62, which causes the ranking generation unit to execute the ranking generation processing of updating said to-be-reverted list, wherein said session management processing includes, when allocating said virtual machine whose differential disk capacity is the smallest in said to-be-reverted list to said thin client terminal, requesting the ranking generation processing unit to delete the virtual machine in question from said to-be-reverted list.

(Supplementary note 64) The connection management program according to supplementary note 62 or supplementary note 63, which causes the connection setting management information storage unit to execute the connection setting management information storing processing of storing the virtual machine state table which manages a state of said virtual machine, wherein said session management processing includes, with respect to said virtual machine to be allocated to said thin client terminal, changing the state information in said virtual machine state table to in-use, as well as requesting said ranking generation processing unit to delete the virtual machine in question from the to-be-reverted list, and said state information is information indicating whether said virtual machine is any of available, in-use and in-maintenance.

(Supplementary note 65) The connection management program according to supplementary note 64, wherein said session management processing includes, when detecting disconnection of said virtual machine, changing said state information of said virtual machine state table to available, as well as requesting said ranking generation processing unit to add the virtual machine in question to the to-be-reverted list.

(Supplementary note 66) The connection management program according to supplementary note 65, wherein said ranking generation processing includes obtaining a differential disk capacity of the virtual machine in question from said virtual machine management server, and comparing a predetermined differential disk capacity threshold value related to said virtual machine and said differential disk capacity obtained and when said differential disk capacity is not more than said differential disk capacity threshold value, notifying said session management processing unit to that effect, and said session management processing includes, upon receiving said notification from said ranking generation processing unit, preserving a user name of a user using said thin client terminal as information indicative of a user name used immediately before of said virtual machine in said virtual machine state table.

(Supplementary note 67) A computer-readable medium storing a connection management program operable on a computer forming a connection management server which manages connection between a thin client terminal and a virtual machine, which causes a ranking information storage unit to execute the ranking information storing processing of storing a to-be-reverted list in which virtual machines to be reverted are arranged in descending order of differential disk capacities, and a session management unit to execute the session management processing of determining said virtual machine to be allocated to said thin client terminal based on said to-be-reverted list, wherein said session management processing includes when available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 68) The connection management program according to supplementary note 67, wherein said session management processing includes, determining whether among available virtual machines there exists, in said virtual machine state table including information indicative of a user name used immediately before of each virtual machine, a virtual machine whose said user name used immediately before is coincident with a user name using said thin client terminal, when there exists a virtual machine having a coincident user name, allocating the virtual machine in question to said thin client terminal, when there exists no virtual machine having a coincident user name, if available virtual machines include a virtual machine not included in said to-be-reverted list, allocating the virtual machine in question to said thin client terminal, and when all the available virtual machines are included in said to-be-reverted list, allocating said virtual machine whose differential disk capacity is the smallest in said to-be-reverted list to said thin client terminal.

(Supplementary note 69) The connection management program according to supplementary note 67 or supplementary note 68, which causes a ranking generation unit to execute the ranking generation processing of updating said to-be-reverted list, wherein said session management processing includes, when allocating said virtual machine whose differential disk capacity is the smallest in said to-be-reverted list to said thin client terminal, requesting the ranking generation processing unit to delete the virtual machine in question from said to-be-reverted list.

(Supplementary note 70) The connection management program according to supplementary note 69, which causes a connection setting management information storage unit to execute the connection setting management information storing processing of storing the virtual machine state table which manages a state of said virtual machine, wherein said session management processing includes, with respect to said virtual machine to be allocated to said thin client terminal, changing the state information in said virtual machine state table to in-use, as well as requesting said ranking generation processing unit to delete the virtual machine in question from the to-be-reverted list, and said state information is information indicating whether said virtual machine is any of available, in-use and in-maintenance.

(Supplementary note 71) The connection management program according to supplementary note 70, wherein said session management processing includes, when detecting disconnection of said virtual machine, changing said state information of said virtual machine state table to available, as well as requesting said ranking generation processing unit to add the virtual machine in question to the to-be-reverted list.

(Supplementary note 72) The connection management program according to supplementary note 71, wherein said ranking generation processing includes obtaining a differential disk capacity of the virtual machine in question from said virtual machine management server, and comparing a predetermined differential disk capacity threshold value related to said virtual machine and said differential disk capacity obtained and when said differential disk capacity is not more than said differential disk capacity threshold value, notifying said session management processing unit to that effect, and said session management processing includes, upon receiving said notification from said ranking generation processing unit, preserving a user name of a user using said thin client terminal as information indicative of a user name used immediately before of said virtual machine in said virtual machine state table.

(Supplementary note 73) A computer-readable medium storing a reverting processing management program operable on a computer forming a connection management server which manages connection between a thin client terminal and a virtual machine, which causes a ranking information storage unit to execute the ranking information storing processing of storing a to-be-reverted list in which virtual machines to be reverted are arranged in descending order of differential disk capacities, and a maintenance processing management unit to execute the maintenance processing management processing of referring to said to-be-reverted list to request a virtual machine management server which executes reverting processing of a virtual machine to execute reverting processing of a virtual machine in descending order of differential disk capacities.

(Supplementary note 74) The reverting processing management program according to supplementary note 73, which causes a connection setting management information storage unit to execute the connection setting management information storing processing of storing a virtual machine state table which manages a state of said virtual machine, wherein said maintenance processing management processing includes with respect to said virtual machine whose reverting processing is to be requested, after changing the state information in said virtual machine state table to in-maintenance, requesting said virtual machine management server to execute the reverting processing of the virtual machine in question, and upon receiving a notification of end of said reverting processing, changing said state information in said virtual machine state table to available, and said state information is information indicating whether said virtual machine is any of available, in-use and in-maintenance.

(Supplementary note 75) The reverting processing management program according to supplementary note 74, wherein said maintenance processing management processing includes, upon receiving a notification of end of said reverting processing, changing said state information in said virtual machine state table to available, as well as deleting information indicative of a user name used immediately before of said virtual machine included in said virtual machine state table.

(Supplementary note 76) The reverting processing management program according to any one of supplementary note 73 through supplementary note 75, which causes a ranking generation unit to execute the ranking generation processing of updating said to-be-reverted list, wherein said maintenance processing management processing includes, upon receiving a notification of the end of said reverting processing from said virtual machine management server, requesting said ranking generation processing unit to delete the virtual machine in question from said to-be-reverted list.

INCORPORATION BY REFERENCE

This application is based upon and supplementary notes the benefit of priority from Japanese patent application No. 2012-037602 filed on Feb. 23, 2012, the disclosure of which is incorporated herein in its entirety by reference.

What is claimed is:
1. A thin client system comprising:
a virtual machine server on which a virtual machine operates;
a thin client terminal to be connected to said virtual machine;
a connection management server which manages connection between said thin client terminal and said virtual machine; and a virtual machine management server including a reverting processing execution unit which executes reverting processing of said virtual machine;

wherein said connection management server includes:

a ranking information storage unit implemented at least in hardware of said connection management server having a to-be-reverted list stored in which virtual machines including said virtual machine to be reverted are arranged in descending order of differential disk capacities, a session management unit implemented at least in the hardware and which determines said virtual machine to be allocated to said thin client terminal based on said to-be-reverted list, and a maintenance processing management unit implemented at least in the hardware and which refers to said to-be-reverted list to request said virtual machine management server to execute the reverting processing in descending order of differential disk capacities, wherein said session management unit when the available virtual machines are included in said to-be-reverted list, allocates said virtual machine whose capacity of a differential disk is the smallest in said to-be-reverted list to said thin client terminal, said ranking information storage unit deletes said allocates virtual machine from said to-be-reverted list, said maintenance processing management unit refers to said to-be-reverted list and requests said virtual machine management server to execute the reverting processing of the virtual machine, and upon receiving a notification of end of said reverting processing, and said session management unit, ranking information storage unit and said maintenance processing management unit repeat the above-series of processing.

2. The thin client system according to claim 1, comprising:

a connection setting management information storage unit implemented at least in the hardware and which stores a virtual machine state table regarding a state of said virtual machine, wherein said virtual machine state table includes state information indicating whether said virtual machine is any of available, in-use and in-maintenance, and said maintenance processing management unit with respect to said virtual machine whose reverting processing is to be requested, after changing said state information in said virtual machine state table to in-maintenance, requests said virtual machine management server to execute the reverting processing of the virtual machine, and upon receiving a notification of end of said reverting processing, changes said state information in said virtual machine state table to available.

3. The thin client system according to claim 2, wherein said virtual machine state table includes other information indicative of a user name previously used with respect to the virtual machine, and said maintenance processing management unit, upon receiving a notification of end of said reverting processing, changes said state information in said virtual machine state table to be available, as well as deleting the other information indicative of said user name previously used in said virtual machine state table.

4. The thin client system according to claim 3, wherein said session management unit, determines whether among the available virtual machines there exists in the virtual machine state table a virtual machine whose said user name used previously is identical to a user name using said thin client terminal, when there exists the virtual machine having the identical user name, allocates the virtual machine to said thin client terminal, when there exists no virtual machine having the identical user name, if available virtual machines include a virtual machine not included in said to-be-reverted list, allocates the virtual machine to said thin client terminal, and when all the available virtual machines are included in said to-be-reverted list, allocates said virtual machine whose capacity of the differential disk is the smallest in said to-be-reverted list to said thin client terminal.

5. The thin client system according to claim 2, wherein said connection management server comprises a ranking generation unit which updates said to-be-reverted list, said virtual machine state table includes other information indicative of a user name used previously with respect to the virtual machine, said session management unit, when detecting disconnection of said virtual machine, changes said state information of said virtual machine state table to available, as well as requesting said ranking generation unit to add the virtual machine to the to-be-reverted list, said ranking generation unit obtains a capacity of the differential disk of the virtual machine from said virtual machine management server, and compares a predetermined differential disk capacity threshold value related to said virtual machine and said capacity of the differential disk obtained and when said capacity of the differential disk is not more than said differential disk capacity threshold value, notifies said session management unit to that effect, and said session management unit, upon receiving said notification from said ranking generation unit, preserves the user name of a user using said thin client terminal as said user name used immediately before in said virtual machine state table.

6. A connection management server which manages connection between a thin client terminal and a virtual machine, comprising:

a ranking information storage unit implemented at least in hardware and having a to-be-reverted list stored in which virtual machines including said virtual machine to be reverted are arranged in descending order of differential disk capacities;

a session management unit implemented at least in the hardware and which determines said virtual machine to be allocated to said thin client terminal based on said to-be-reverted list; and a maintenance processing management unit implemented at least in the hardware and which refers to said to-be-reverted list to request a virtual machine management server which executes reverting processing of the virtual machine to execute the reverting processing in descending order of differential disk capacities; wherein said session management unit, when all the available virtual machines are included in said to-be-reverted list, allocates said virtual machine whose capacity of a differential disk is the smallest in said to-be-reverted list to said thin client terminal, said ranking information storage unit deletes said allocates virtual machine from said to-be-reverted list, said maintenance processing management unit refers to said to-be-reverted list and requests said virtual machine management server to execute the reverting processing of the virtual machine, and upon receiving a notification of end of said reverting processing, and said session management unit, ranking information storage unit and said maintenance processing management unit repeat the above-series of processing.

7. A connection management method by a connection management server which manages connection between a thin client terminal and a virtual machine, wherein
   a ranking information storage unit implemented at least in hardware and which executes the ranking information storing step of storing a to-be-reverted list in which virtual machines including said virtual machine to be reverted are arranged in descending order of differential disk capacities,
   a session management unit implemented at least in the hardware and which executes the session management step of determining said virtual machine to be allocated to said thin client terminal based on said to-be-reverted list, and
   a maintenance processing management unit implemented at least in the hardware and which executes the maintenance processing management step of referring to said to-be-reverted list to request a virtual machine management server which executes reverting processing of a virtual machine to execute the reverting processing of said virtual machine in descending order of differential disk capacities; wherein
   said session management step includes
   when all the available virtual machines are included in said to-be-reverted list, allocating said virtual machine whose capacity of the differential disk is the smallest in said to-be-reverted list to said thin client terminal,
   said ranking information storage unit deletes said allocates virtual machine from said to-be-reverted list,
   said maintenance processing management unit refers to said to-be-reverted list and requests said virtual machine management server to execute the reverting processing of the virtual machine, and upon receiving a notification of end of said reverting processing, and said session management unit, ranking information storage unit and said maintenance processing management unit repeat the above-series of processing.

8. A non-transitory computer-readable medium storing a connection management program operable on a computer forming a connection management server which manages connection between a thin client terminal and a virtual machine, which causes:
   a ranking information storage unit implemented at least in hardware to execute the ranking information storing processing of storing a to-be-reverted list in which virtual machines including said virtual machine to be reverted are arranged in descending order of differential disk capacities,
   a session management unit implemented at least in the hardware to execute the session management processing of determining said virtual machine to be allocated to said thin client terminal based on said to-be-reverted list, and
   a maintenance processing management unit implemented at least in the hardware to execute the maintenance processing management processing of referring to said to-be-reverted list to request a virtual machine management server which executes reverting processing of the virtual machine to execute the reverting processing of the virtual machine in descending order of differential disk capacities, wherein
   said session management processing includes
   when all the available virtual machines are included in said to-be-reverted list, allocating said virtual machine whose capacity of the differential disk is the smallest in said to-be-reverted list to said thin client terminal,
   said ranking information storage unit deletes said allocates virtual machine from said to-be-reverted list,
   said maintenance processing management unit refers to said to-be-reverted list and requests said virtual machine management server to execute the reverting processing of the virtual machine, and upon receiving a notification of end of said reverting processing, and
   said session management unit, ranking information storage unit and said maintenance processing management unit repeat the above-series of processing.

\* \* \* \* \*